(12) United States Patent
de Oliveira et al.

(10) Patent No.: US 11,521,151 B2
(45) Date of Patent: Dec. 6, 2022

(54) TRACKING INDUSTRIAL VEHICLE OPERATOR QUALITY

(71) Applicant: Crown Equipment Corporation, New Bremen, OH (US)

(72) Inventors: Sergio Schulte de Oliveira, Troy, OH (US); Robert J. Kelley, New Bremen, OH (US); Benjamin J. Purrenhage, Kalamazoo, MI (US); Philip W. Swift, Oakwood, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 17/002,437

(22) Filed: Aug. 25, 2020

(65) Prior Publication Data

US 2020/0387851 A1   Dec. 10, 2020

Related U.S. Application Data

(63) Continuation of application No. 14/147,180, filed on Jan. 3, 2014, now abandoned.

(Continued)

(51) Int. Cl.
  *G06Q 10/06* (2012.01)
(52) U.S. Cl.
  CPC .............................. *G06Q 10/06395* (2013.01)
(58) Field of Classification Search
  None
  See application file for complete search history.

(56) References Cited

U.S. PATENT DOCUMENTS

| 5,738,187 A | 4/1998 | Dammeyer et al. |
| 5,758,299 A | 5/1998 | Sandborg et al. |

(Continued)

FOREIGN PATENT DOCUMENTS

| CA | 2397372 C | 8/2013 |
| CN | 101002239 A | 7/2007 |

(Continued)

OTHER PUBLICATIONS

Akyuz, "Supply chain performance measurement: a literature review", 2010, International Journal of Production Research, vol. 48, No. 17, pp. 5137-5155 (Year: 2010).*

(Continued)

*Primary Examiner* — Ivan R Goldberg
(74) *Attorney, Agent, or Firm* — Stevens & Showalter LLP

(57) ABSTRACT

The overall quality of a workforce is analyzed, scored and presented using an analysis engine that performs a multi-domain analysis on enterprise data. The analysis engine presents key information about the performance of a workforce across a range of hardware devices so as to inform different users in their unique contexts and roles within a business organization as to workforce performance. The analysis engine associates a customizable performance profile with each workforce member. Each performance profile is comprised of a plurality of performance measures. Each performance measure in turn, represents a performance metric that measures some aspect of the job duties performed by the associated workforce member, e.g., an industrial vehicle operator. The scores are aggregated into an overall performance profile score. To compute the scores, data is considered across multiple domains, e.g., by collecting and analyzing data from industrial vehicle data systems, (Continued)

warehouse management systems, labor management systems, etc.

17 Claims, 17 Drawing Sheets

Related U.S. Application Data

(60) Provisional application No. 61/748,620, filed on Jan. 3, 2013.

(56) References Cited

U.S. PATENT DOCUMENTS

| | | | |
|---|---|---|---|
| 6,909,947 B2 | 6/2005 | Douros et al. | |
| 7,356,392 B2 | 4/2008 | Hubbard et al. | |
| 8,060,400 B2 | 11/2011 | Wellman | |
| 8,466,781 B2 | 6/2013 | Miller et al. | |
| 8,497,761 B2 | 7/2013 | McNeill et al. | |
| 8,509,990 B2 | 8/2013 | Bennett et al. | |
| 8,515,629 B2 | 8/2013 | Medwin et al. | |
| 8,587,420 B2 | 11/2013 | Koen | |
| 2002/0128751 A1 | 9/2002 | Engstrom et al. | |
| 2004/0073359 A1* | 4/2004 | Ichijo | B66F 9/0755 701/50 |
| 2005/0071737 A1 | 3/2005 | Adendorff et al. | |
| 2005/0131597 A1 | 6/2005 | Raz et al. | |
| 2006/0161471 A1 | 7/2006 | Hulen et al. | |
| 2007/0195944 A1 | 8/2007 | Korenblit et al. | |
| 2007/0239322 A1* | 10/2007 | McQuade | G07C 5/008 701/1 |
| 2008/0015955 A1 | 1/2008 | Ehrman et al. | |
| 2008/0040206 A1 | 2/2008 | Silvera et al. | |
| 2008/0122636 A1 | 5/2008 | Matos | |
| 2008/0125933 A1 | 5/2008 | Williams et al. | |
| 2008/0154691 A1 | 6/2008 | Wellman et al. | |
| 2008/0154712 A1* | 6/2008 | Wellman | G06Q 10/06 235/384 |
| 2008/0162204 A1 | 7/2008 | Kaiser et al. | |
| 2009/0063238 A1* | 3/2009 | Storzum | G06Q 10/10 705/7.42 |
| 2009/0099898 A1 | 4/2009 | Ehrman et al. | |
| 2010/0036696 A1 | 2/2010 | Lang et al. | |
| 2010/0153207 A1 | 6/2010 | Roberts et al. | |
| 2010/0179844 A1 | 7/2010 | Lafergola et al. | |
| 2011/0040440 A1* | 2/2011 | de Oliveira | G06Q 10/06 701/29.5 |
| 2011/0216185 A1* | 9/2011 | Laws | B66F 9/063 348/121 |
| 2012/0226421 A1 | 9/2012 | Kote et al. | |
| 2012/0239261 A1 | 9/2012 | Medwin et al. | |
| 2014/0188576 A1 | 7/2014 | De Oliveira et al. | |

FOREIGN PATENT DOCUMENTS

| | | |
|---|---|---|
| EP | 2207145 A2 | 7/2010 |
| JP | 2003034496 A | 2/2003 |
| KR | 20070065307 A | 6/2007 |
| KR | 20120054630 A | 5/2012 |
| RU | 2450357 C1 | 5/2012 |
| WO | 2011019872 A2 | 2/2011 |

OTHER PUBLICATIONS

Korean Notice of Final Rejection dated Feb. 26, 2021; Korean Application No. 10-2015-7020900; Korean Intellectual Property Office; Korea.
Office Action dated May 21, 2019; Mexican Application No. MX/a/2015/008717; Mexican Institute of Industrial Property; Mexico City, Mexico.
Office Action dated Feb. 27, 2018; Mexican Application No. MX/a/2015/008717; Mexican Institute of Industrial Property; Mexico City, Mexico.
Decision to Grant dated Oct. 3, 2017; Russian Application No. 2015126649; Russian Federation.
Exam Report dated Oct. 29, 2015; Russian Application No. 2015126649; Russian Federation.
International Preliminary Report on Patentability dated Jul. 7, 2015; International Application No. PTC/2014/010209; The International Bureau of WIPO; Geneva, Switzerland.
Weidmann, Matthias; Decision to Refuse dated Oct. 29, 2019; European Application No. 14702325.3; European Patent Office; Munich, Germany.
Everitt, David; Examination Report No. 2 dated May 18, 2021; Australian Patent Application No. 2019240632; IP Australia.
Oh, Eung Gie; International Search Report and Written Opinion of the International Searching Authority; International Application No. PCT/US2014/010209; dated Aug. 14, 2014; Korean Intellectual Property Office; Daejeon Metropolitan City, Republic of Korea.
Fourth Office Action; Mexican Patent Application No. MX/a/2015/008717; dated Jul. 30, 2018; Mexican Institute of Industrial Property; Ciudad, Mexico.
Office Action; Mexican Patent Application No. MX/a/2015/008717; dated Jul. 7, 2017; Mexican Institute of Industrial Property; Ciudad, Mexico.
Goldberg, Ivan R; Office Action; U.S. Appl. No. 14/147,180; dated Oct. 3, 2016; United States Patent and Trademark Office; Alexandria, Virginia.
Office Action dated Dec. 6, 2016; Mexican Patent Application No. MX/a/2015/008717; Mexican Institute of the Industrial Property; Ciudad, Mexico.
Weidmann, Matthias; Extended European Search Report; European Patent Application No. 14702325.3; dated Mar. 22, 2016; European Patent Office; Munich, Germany.
Goldberg, Ivan R; Final Office Action; U.S. Appl. No. 14/147,180; dated Apr. 24, 2017; United States Patent and Trademark Office; Alexandria, Virginia.
Office Action dated Feb. 9, 2017; Russia Patent Application No. 2015126649; Russian Federation.
Wang Ying; First Office Action; Chinese Patent Application No. 201480003599.2; dated Jul. 3, 2017; State Intellectual Property Office of the People's Republic of China.
Weidmann, Matthias; Official Action; EP Patent Application No. 14702325.3; dated Sep. 19, 2017; European Patent Office; Germany.
Goldberg, Ivan R; Final Office Action; U.S. Appl. No. 14/147,180; dated Jul. 30, 2018; United States Patent and Trademark Office; Alexandria, Virginia.
Goldberg, Ivan R; Office Action; U.S. Appl. No. 14/147,180; dated Dec. 31, 2018; United States Patent and Trademark Office; Alexandria, Virginia.
Goldberg, Ivan R; Office Action; U.S. Appl. No. 14/147,180; dated Mar. 7, 2018; United States Patent and Trademark Office; Alexandria, Virginia.
Wang Ying; Second Office Action; Chinese Patent Application No. 201480003599.2; dated Jan. 31, 2018; Chinese Patent Office; Beijing, China.
Wang Ying; Third Office Action; Chinese Patent Application No. 201480003599.2; dated Aug. 3, 2018; Chinese Patent Office; Beijing, China.
Wang Ying; Fourth Office Action; Chinese Patent Application No. 201480003599.2; dated Jan. 2, 2019; State Intellectual Property Office of the People's Republic of China.
Weidmann, Matthias; Official Action and Summons to Attend Oral Proceedings; European Patent Application No. 14720325.3; dated Apr. 17, 2019; European Patent Office; Munich, Germany.
Weidmann, Matthias; Official Action; European Patent Application No. 14720325.3; dated Oct. 14, 2019; European Patent Office; Munich, Germany.
Extended European Search Report; European Patent Application No. 19219706.9; dated May 13, 2020; European Patent Office; Munich, Germany.
Seong-Cheol Byeon; Notice of Reason for Refusal; Korean Application No. 10-2015-7020900; dated Jun. 30, 2020; Korean Intellectual Property Office; Korea.

(56) References Cited

OTHER PUBLICATIONS

First Search; Chinese Patent Application No. 201480003599.2; dated Jun. 23, 2017; Chinese Patent Office; Beijing, China.
Notification to Grant; Chinese Patent Application No. 201480003599.2; dated Apr. 29, 2019; Chinese Patent Office; Beijing, China.
Chirag Mehta; Examination Report No. 1; Australian Patent Application No. 2014204011; dated Oct. 10, 2018; IP Australia; Australian Government.
Everitt, David; Examination Report No. 2; Australian Patent Application No. 2014204011; dated Sep. 2, 2019; IP Australia; Australian Government.
Everitt, David; Examination Report No. 1; Australian Patent Application No. 2019240632; dated May 27, 2020; IP Australia; Australian Government.
Minghui Shi; Examiner Requisition dated May 22, 2019; Canadian Patent Application No. 2896876; Canadian Intellectual Property Office; Canada.
Minghui Shi; Examiner Requisition dated Jun. 8, 2020; Canadian Patent Application No. 2896876; Canadian Intellectual Property Office; Canada.
Goldberg, Ivan R.; Decision on Appeal; U.S. Appl. No. 14/147,180; Jun. 25, 2020; United States Patent and Trademark Office; Alexandria, Virginia.
Minghui Shi; Examiner Requisition dated Mar. 12, 2021; Canadian Application No. 2,896,876; Canadian Intellectual Property Office; Canada.
Examination report No. 1 for standard patent application dated Jul. 28, 2022; Australian Application No. 2021203454; IP Australia.

* cited by examiner

TRACKING INDUSTRIAL VEHICLE OPERATOR QUALITY

CROSS REFERENCE TO RELATED APPLICATIONS

This application is a continuation of U.S. patent application Ser. No. 14/147,180, filed Jan. 3, 2014, entitled TRACKING INDUSTRIAL VEHICLE OPERATOR QUALITY, which is pending, which claims the benefit of U.S. Provisional Patent Application Ser. No. 61/748,620, filed Jan. 3, 2013, entitled TRACKING INDUSTRIAL VEHICLE OPERATOR QUALITY, the disclosures of which are hereby incorporated by reference.

BACKGROUND

The present disclosure relates in general to methods and computer implemented systems for collecting workforce data, for scoring workforce quality and for presenting actionable workforce information.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via a mobile wireless transceiver. For instance, in order to move items about the operator's facility, workers often utilize industrial vehicles, including for example, forklift trucks, hand and motor driven pallet trucks, etc. The wireless transceiver is used as an interface to the management system to direct workers operating the industrial vehicles in their tasks, e.g., by instructing workers where and/or how to pick, pack, put away, move, stage, process or otherwise manipulate the items within the operator's facility. The wireless transceiver may also be used in conjunction with a suitable input device to scan, sense or otherwise read tags, labels or other identifiers to track the movement of designated items within the facility.

BRIEF SUMMARY

According to aspects of the present disclosure, a system for tracking the performance of a fleet of materials handling vehicles is provided. The system comprises a first processing device in data communication with a remote server computer. The first processing device includes a graphical user interface that enables a user to create, for each of a plurality of vehicle operators, a corresponding operator-specific performance profile instance, each operator-specific performance profile instance comprising an electronic record that stores in memory accessible by the remote server computer, a set of performance measures that characterize industrial usage by the associated vehicle operator. The graphical user interface also enables the user to customize a threshold for an associated performance measure within the set of performance measures, the threshold storing in the memory, a baseline performance customized uniquely to the associated vehicle operator against the associated performance measure. Moreover, the graphical user interface enables the user to customize an algorithm that is implemented by the remote server computer for at least one performance measure within the set of performance measures. Still further, the graphical user interface enables the user to weight each performance measure in the set of performance measures so that performance measures in the set of performance measures contribute differently to an overall operator score.

Correspondingly, the remote server computer further implements an analysis engine, where the analysis engine is programmed by code that causes the remote server computer to collect automatically, vehicle usage information from each industrial vehicle in a fleet of industrial vehicles, the vehicle usage information collected as each industrial vehicle in the fleet is being used, the collected vehicle usage information wirelessly communicated by a transceiver in each industrial vehicle in the fleet to the remote server computer for electronic storage in an industrial vehicle data source. The analysis engine also updates repeatedly, a current state of each operator-specific performance profile instance by implementing code to evaluate each performance measure in the set of performance measures based upon the customized algorithm and the customized threshold received from the first processing device, against the collected vehicle usage information, and generate a score for the current state of each operator-specific performance profile instance, where the generated score is based upon the weight assigned to each performance measure in the set of performance measures. The remote server computer further wirelessly transmits first information to a select industrial vehicle in the fleet of industrial vehicles for processing thereby, where the transmitted information is based upon the updated current state of the operator-specific performance profile instance of the associated vehicle operator. The remote server also transmits second information to the first processing device, where the transmitted information is based upon the updated current state of the operator-specific performance profile instance for each of the plurality of vehicle operators for output to the graphical user interface.

According to further aspects of the present disclosure, a system for tracking performance of a fleet of materials handling vehicles is provided. The system comprises a display on an industrial vehicle, and an information linking device on the industrial vehicle. The information linking device has a processor in data communication with the display. The processor wirelessly communicates across a network to a remote server computer. In this regard, the processor is programmed to collect an operator login to identify the industrial vehicle operator. The processor is also programmed to output to the display in a first view, an instruction to the operator to perform a task, where the instruction is wirelessly received from the remote server computer. Also, the processor is programmed to collect automatically, industrial vehicle generated information as the industrial vehicle is operated over time to complete the task. Additionally, the processor is programmed to communicate automatically, the collected operator login and the collected industrial vehicle generated information to the remote server computer, and output to the display, a second view that consolidates into a single screen a real-time status of a progress meter that identifies a current state of progress of the operator relative to the task.

According to still further aspects of the present disclosure, an industrial vehicle information system is provided. The system comprises a display on an industrial vehicle, a camera on the industrial vehicle, and an information linking device on the industrial vehicle. The information linking device has a processor in data communication with the display and the camera. The processor further communicates wirelessly across a network to a remote server computer. The processor is programmed to collect an operator login to identify the industrial vehicle operator. The processor is also programmed to output to the display in a first view, an instruction to the operator to perform a task, where the instruction is wirelessly received from the remote server computer. The processor is further programmed to collect automatically, industrial vehicle generated information as the industrial vehicle is operated over time to complete the task, the industrial vehicle generated information including vehicle speed, direction of travel, load weight, and load height, and communicate automatically, the collected operator login and the collected industrial vehicle generated information to the remote server computer. Moreover, the processor is programmed to output to the display, a second view that consolidates into a single screen a real-time status of a progress meter that identifies a current state of progress of the operator relative to the task, a current load height as a real-time gauge that follows the actual height of a load handling feature of the industrial vehicle that is carrying the load along with a camera view from the camera, that displays images from the perspective of the load handling feature, so as to allow the operator to view the load handling feature as the load is retrieved or put away from a high storage location, and a first widget that displays the current speed of the industrial vehicle along with a vehicle view that provides a visual representation that tracks and displays the actions of at least one of the load handling feature or the traction control.

DETAILED DESCRIPTION

According to various aspects of the present disclosure, the overall quality of a workforce is analyzed, scored and presented using a customizable analysis engine that performs a multi-domain analysis on enterprise data. The analysis engine presents key information about the performance of a workforce across a range of hardware devices so as to inform different users (e.g., executives, managers, supervisors and the scored operators themselves), in their unique contexts and roles within the business organization, as to the performance of work carried out within an operation.

The analysis engine associates a performance profile with an associated workforce member. Each performance profile is comprised of a plurality of performance measures. Each performance measure in turn, represents a performance metric that measures some aspect of job duties performed by the associated workforce member. The various scores associated with the performance measures are aggregated into an overall performance profile score. In order to compute the various scores, data is considered across one or more domains, e.g., by collecting and analyzing data from what are normally separate and independent systems, such as industrial vehicle data collection systems, warehouse management systems, labor management systems, etc.

Figure 1:
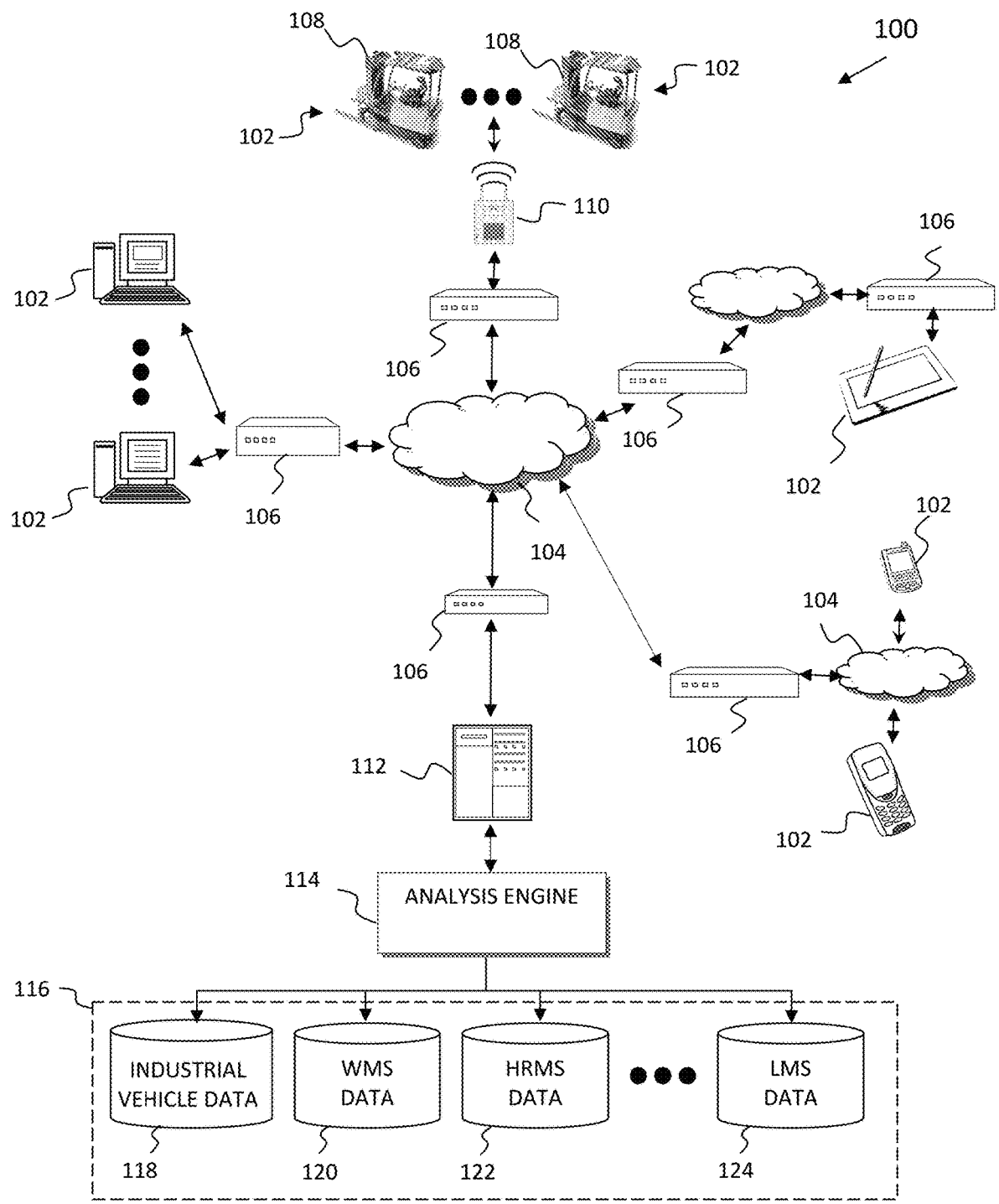
FIG. 1 is a block diagram of a system that can be utilized as an infrastructure to implement one or more of the methods, processes, or features as set out in the flow charts, block diagrams, screen shots and other views of FIGS. 2-17, individually, or in combinations thereof, according to aspects of the disclosure herein.

System Overview:

Referring now to the drawings and in particular to FIG. 1, a general diagram of a computer system 100 is illustrated according to various aspects of the present disclosure. The system 100 can be utilized for collecting workforce data, for scoring workforce quality, for presenting workforce information, and performing other functions and features described in the subsequent figures, as will be described in greater detail herein.

The computer system 100 comprises a plurality of hardware and/or software processing devices, designated generally by the reference 102 that are linked together by one or more network(s) designated generally by the reference 104. Typical processing devices 102 include for example, cellular mobile telephones and smart telephones, tablet computers, personal data assistant (PDA) processors, palm computers, and other portable computing devices. The processing devices 102 can also comprise netbook computers, notebook computers, personal computers and servers. Still further, the processing devices 102 may comprise transactional systems, purpose-driven appliances, special purpose computing devices and/or other devices capable of communicating over the network 104, examples of which are described in greater detail below.

The network 104 provides communications links between the various processing devices 102, and may be supported by networking components 106 that interconnect the processing devices 102, including for example, routers, hubs, firewalls, network interfaces, wired or wireless communications links and corresponding interconnections, cellular stations and corresponding cellular conversion technologies, e.g., to convert between cellular and tcp/ip, etc. Moreover, the network(s) 104 may comprise connections using one or more intranets, extranets, local area networks (LAN), wide area networks (WAN), wireless networks (WIFI), the Internet, including the world wide web, cellular and/or other arrangements for enabling communication between the processing devices 102, in either real time or otherwise, e.g., via time shifting, batch processing, etc.

In certain contexts and roles, the processing device 102 is intended to be mobile, e.g., a processing device 102 provided on an industrial vehicle 108 such as a forklift truck, reach truck, stock picker, tow tractor, rider pallet truck, walkie, etc. Under such circumstances, an industrial vehicle 108 utilizes a corresponding processing device 102 to wirelessly communicate through one or more access points 110 to a corresponding networking component 106. Alternatively, the processing device 102 on the industrial vehicles 108 can be equipped with, or otherwise access WIFI, cellular or other suitable technology that allows the processing device 102 on the industrial vehicle 108 to communicate directly with a remote device, e.g., over the networks 104.

The illustrative system 100 also includes a server 112, e.g., a web server, file server, and/or other processing device that supports an analysis engine 114 and corresponding data sources (collectively identified as data sources 116). The analysis engine 114 and data sources 116 provide the resources to analyze, score and present information including the overall quality of a workforce, as described in greater detail herein.

In an exemplary implementation, the data sources 116 are implemented by a collection of databases that store various types of information related to a business operation, e.g., a warehouse, distribution center, retail store, manufacturer, etc. In the illustrative example, the data sources 116 include databases from multiple, different and independent domains, including an industrial vehicle information database 118, a warehouse management system (WMS) 120, a human resources management system (FIRMS) 122, a labor management system (LMS) 124, etc. The above list is not exhaustive and is intended to be illustrative only. Other data, such as from an enterprise resources planning (ERP) database, content management (CM) database, location tracking database, voice recognition, etc., may also and/or alternatively be present. Moreover, data can come from sources that are not directly and/or locally connected to the analysis engine 114. For instance, in certain exemplary implementations, data may be obtained from remote servers, e.g., manufacturer databases, etc.

Traditionally, the individual data sets that comprise the data sources 116 are utilized in isolation resulting in underuse, missed connection and unnecessary overhead. However, as will be discussed in greater detail herein, the analysis engine 114 harvests, mines, queries, accesses, correlates, and otherwise analyzes data across the various data sets/databases within the data source 116 to present workforce information in the appropriate context for a number of given roles.

In the present disclosure, the term "real-time" is used in various contexts to describe aspects of the disclosed system. As used herein, the term "real-time" includes near real time, such as to account for delays caused by the nature of wireless infrastructures, to address transmission delays with mobile devices, computer systems and the inherent processing time required to query data, perform computations generate results, deliver results, etc.

Figure 2:
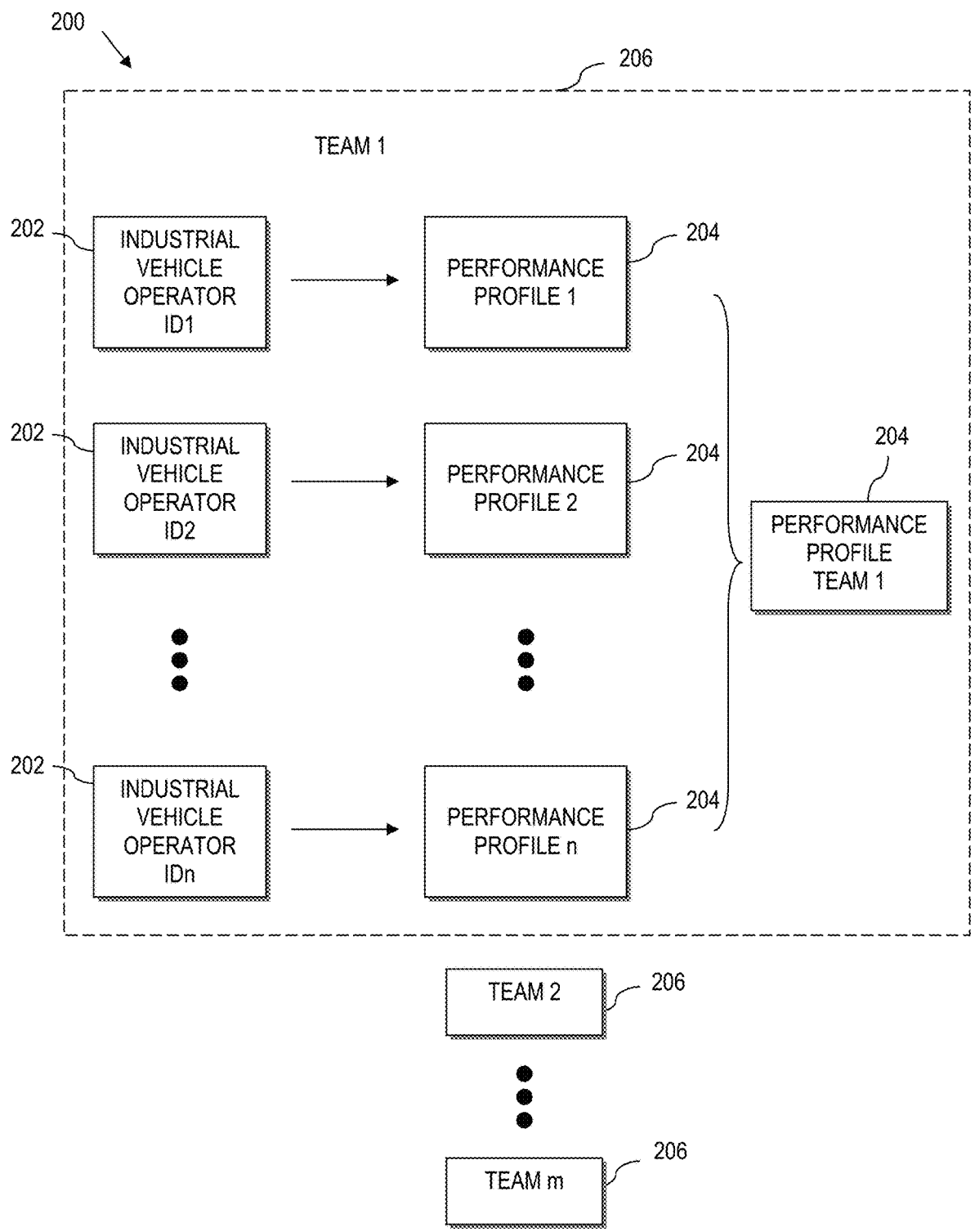
FIG. 2 is a block diagram of an association of industrial vehicle operators to performance profiles, which may be utilized by the analysis engine of FIG. 1, according to aspects of the present disclosure.

Industrial Vehicle Operator Performance Profile:

Referring to FIG. 2, an extensible organizational structure 200 is provided that defines performance profiles where each performance profile is associated with a workforce member. For sake of clarity of discussion herein, the workforce members are comprised of industrial vehicle operators. However, in practice, the concepts herein can be applied to additional roles of workforce members.

The organizational structure 200 may be utilized, for instance, by the analysis engine 114 and may be stored within the data source 116 of the system 100 (FIG. 1). The organizational structure includes a plurality of industrial vehicle operator identifications 202. Each industrial vehicle operator identification 202, and hence each industrial vehicle operator, is uniquely associated with a corresponding instance of a performance profile 204 to define an operator-specific performance profile instance.

A select vehicle operator identification 202 may comprise any mechanism that uniquely associates an industrial vehicle operator with data contained in the data source 116. In this regard, the association between a vehicle operator identification 202 and corresponding information may be a direct association or an indirect association that is derived, computed, implied, linked or otherwise determined.

One or more industrial vehicle operator identifications 202 can be organized in any suitable manner. For instance, industrial vehicle operator identifications 202 can be organized into groups, such as teams, shifts, divisions or other logical organizations. In the illustrative example, industrial vehicle operators are grouped into teams 206. As such, each industrial vehicle operator is also referred to as a team member herein.

Each group, e.g., team 206, may also be uniquely associated with a corresponding instance of a performance profile 204. In this regard, a group performance profile 204 may be the same as, or different from the performance profiles 204 associated with individual operator identifications.

Although illustrated with one grouping, the above approach can be extended both vertically and horizontally. That is, an individual can belong to zero or more groups, e.g., a team group and a shift group (horizontal extension of the group concept). Moreover, groups can be organized into further groups that have a uniquely associated performance profile 204 associated therewith (vertical extension of the group concept). Thus, three different "shift" groups (such as first shift group, a second shift group and a third shift group) can be organized into a "location" group, etc.

Figure 3:
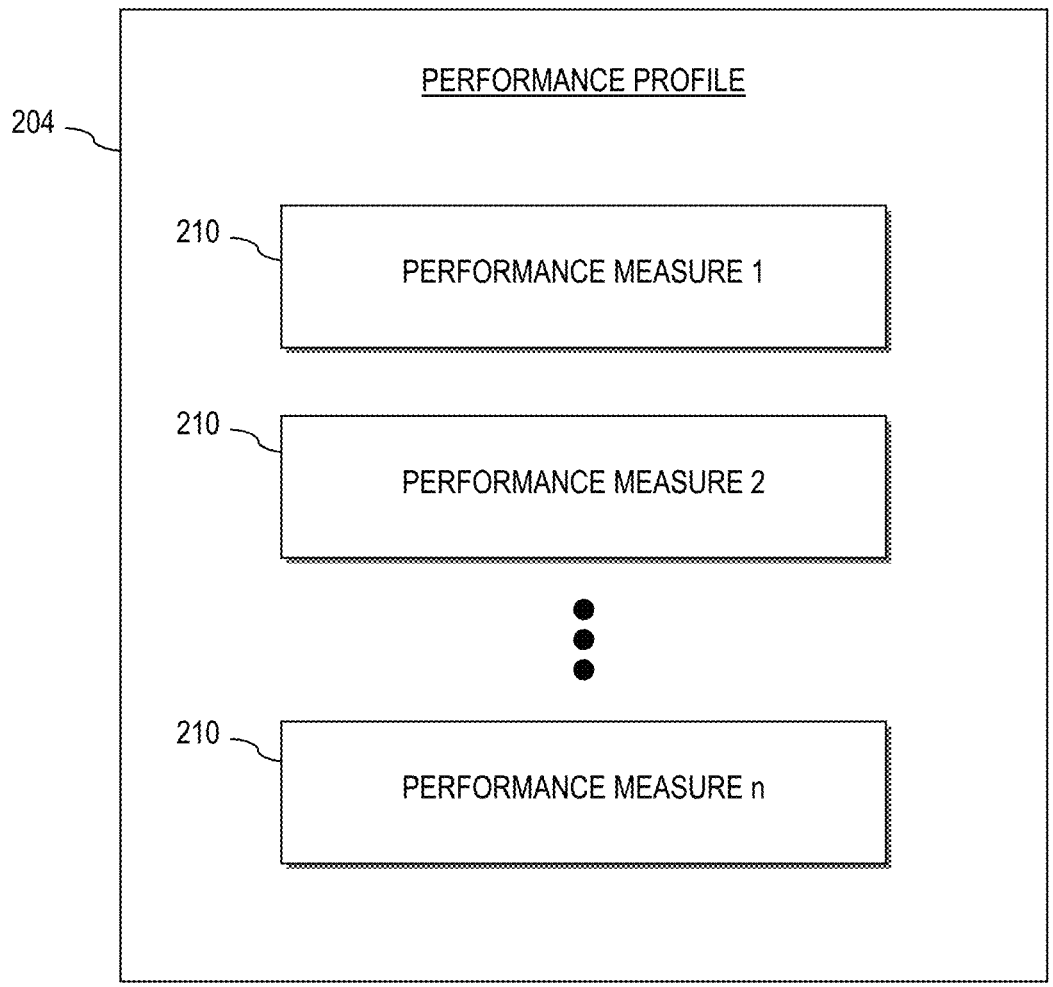
FIG. 3 is a block diagram illustrating an organization of a performance profile into a plurality of performance measures, which may be utilized by the analysis engine of FIG. 1, according to aspects of the present disclosure.

Referring to FIG. 3, each performance profile 204 is comprised of a plurality of performance measures 210. Each performance measure 210 provides a metric that relates to an area of interest. A few performance measures comprise in an exemplary implementation, Productivity; Error Rate; Attendance; Skill; Impacts; Truck Care; Energy Use; Semi-Automation Usage; Teamwork, etc. Of course, the above list is not limiting to the various aspects of the present disclosure herein. In general, each performance measure 210 includes a definition that defines the measure associated with the corresponding metric, e.g., defines how Productivity is evaluated in one example. Each performance measure 210 may also have a threshold target, e.g., a baseline, goal, requirement or other measure of operator performance that is set generally or uniquely for a particular individual.

Figure 4:
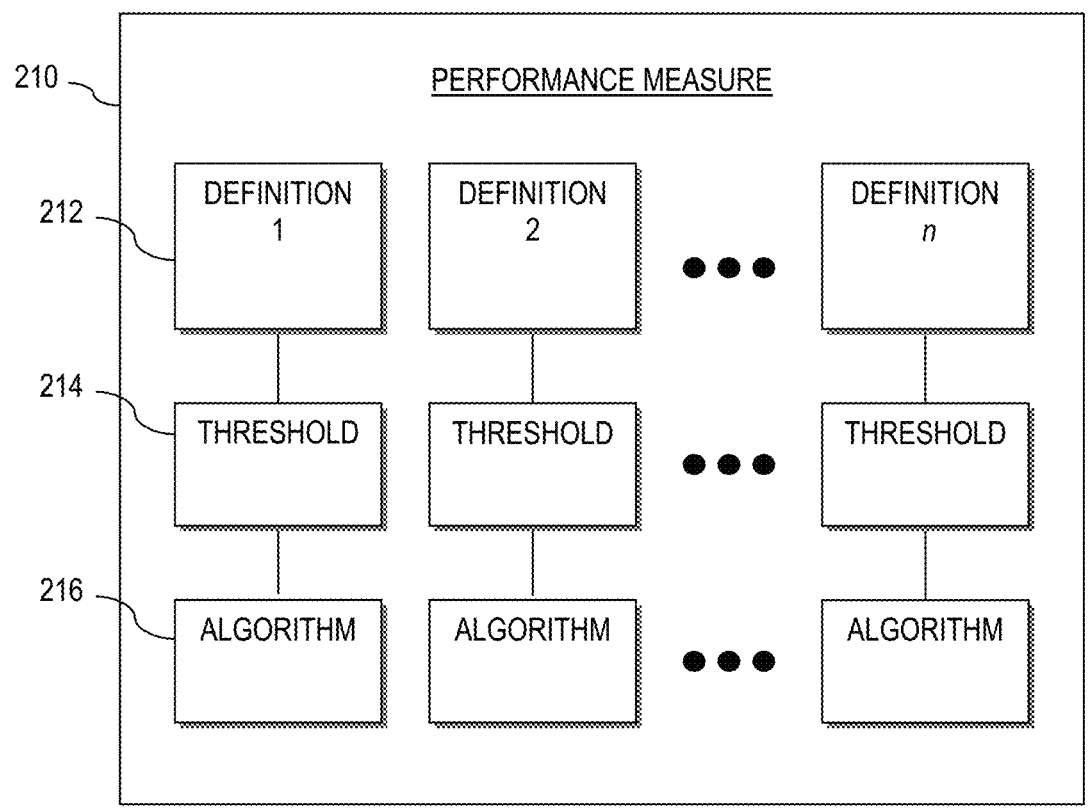
FIG. 4 is a block diagram illustrating an organization of a performance measure into one or more criteria, thresholds and algorithms, which may be utilized by the analysis engine of FIG. 1, according to aspects of the present disclosure herein.

Referring to FIG. 4, in the example as illustrated, a performance measure 210 comprises a definition 212, an optional threshold 214 (also referred to herein as a performance measure threshold target) and an optional algorithm 216 to evaluate or assist in the evaluation of the corresponding definition 212 (e.g., which can be used to customize how an analysis engine evaluates the definition 212).

The definition 212 includes at least one criterion (or set of related criteria) that are used to evaluate the corresponding metric. In this regard, each criterion may be expressed as a rule that specifies conditions, requirements, or both, to evaluate the metric or an aspect thereof. The ability to define a performance measure 210 by a definition 212 that includes one or more criterion allows the underlying metric to vary in complexity from a specific area of interest (e.g., impacts while operating an industrial vehicle) to a general area of interest (e.g., operator care while operating an industrial vehicle).

Thus, a performance measure 210 models a corresponding metric. For instance, a performance measure 210, which may relate to productivity, operator error rate, operator attendance, operator skill, number of impacts while operating an industrial vehicle, industrial vehicle care, efficiency of energy use when operating an industrial vehicle, use of industrial vehicle automation and semi-automation features, teamwork, etc., may be characterized by an appropriate number of criteria to model the desired metric given the nature of the underlying available data.

The threshold 214 is optional, e.g., depending upon the metric, and can be set for one or more criterion. Alternatively, a threshold 214 may be applied across a set of criteria. Yet alternatively, a threshold 214 can be optionally set for the overall performance measure 210. The threshold 214 provides a baseline of the performance of the associated vehicle operator against the associated metric. Accordingly, in practice, each threshold 214 can be set, e.g., by a manager or supervisor, to represent a target achievement goal.

For instance, if a select performance measure 210 is "Impacts", a criterion provided in a definition 212 may be "detect impact while industrial vehicle is moving". Another criterion may define a window, e.g., in time, events, etc., for which the analysis is carried out. An exemplary corresponding algorithm 216 is "count each occurrence of a detected impact in the defined window". Here, the threshold may be defined by a set number of impacts that is customized for the corresponding operator. For instance, a dock operator may trigger a relatively high (expected) count of impacts that are caused by driving over uneven surfaces of the loading dock, ramp and corresponding loading trucks. Thus, a dock operator may have a custom threshold of X impacts. An experienced industrial vehicle operator performing pick operations on a smooth floor may be expected to produce less impacts. As such, the same performance measure (Impacts) may have a relatively low threshold 214, e.g., Y impacts for that operator. Thus, in this example, two vehicle operators are associated with performance profiles 204 that each include a performance measure 210 (Impacts) with the same definition 212 and algorithm 216, but different thresholds 214.

The threshold 214 can also be used as a baseline to represent an attribute of operator performance, e.g., minimum acceptable level of performance, average level of performance, etc. Thus, each definition 212 can have an underlying algorithm 216 that defines the manner in which the criterion/criteria of the definition 212 is measured and optionally, how the criterion/criteria is evaluated against the threshold 214. The threshold 214 can represent above/below a target, pass/fail, or other measure. Moreover, the threshold 214 may be complex, defining one or more ranges, scores or other measures. For instance, the threshold 214 can be utilized to define "grades" such poor, below average, above average, and exceptional. Each of these "scores" can be represented by a different visual metaphor and associated rules that define the boundaries of the range, as will be described in greater detail herein.

Thus, for any given performance measure 210, there can be any number of definitions, thresholds, and algorithms, which can be grouped and organized in any number of combinations to define the desired performance measure. Where there are multiple rules, criteria, thresholds, algorithms, etc., associated with a given performance measure 210, the system can consolidate the various calculations and comparisons into a single, overall aggregated representation to report a single value and a single measure. This approach can be used to create a hierarchical configuration of definitions, thresholds and algorithms that an end user can navigate through to see summary level or detail levels of information pertaining to the given performance measure 210.

Each algorithm 216 can represent a simple measure or a complex formula that extracts and analyzes data across multiple, diverse and otherwise unrelated domains, such as the various databases in the data source 116 (FIG. 1). The algorithms 216 themselves can be logically subdivided into a plurality of parameters, conditions, classes, etc., which can be used by the analysis engine 114 for attribution, e.g., to explain why a particular set of data achieved the computed mark, as will be explained in greater detail herein.

In this regard, the analysis engine 114 of FIG. 1 may implement a particular algorithm 216 by extracting a data value from a particular field in one of the data sources 116 according to a corresponding definition 212, and use the extracted value directly as a measure. For instance, a labor management system (LMS) may provide a measure that can be read directly, e.g., number of sick days. Here, no computation is necessary because the relevant information can be read directly from a database.

However, in other exemplary applications, the data from a data source may not provide directly meaningful information in the context of a performance measure. Rather, other information must be aggregated, inferred, computed, correlated, derived, etc.

For instance, an algorithm 216 directed to productivity can use a Human Resources Management System (HRMS) to determine when a vehicle operator clocks into work at the beginning of a work shift, and when the vehicle operator clocks out of work at the end of the work shift. However, the HRMS has no idea of what the worker does in the period between when clocking in and clocking out. An industrial vehicle management system (IVMS) (industrial vehicle data 118 in FIG. 1) on the other hand, collects and logs truck data based upon vehicle usage. The IVMS knows how the worker used the industrial vehicle, but cannot account for operator time spent off the vehicle. By "bookending" the industrial vehicle data with HRMS data however, the algorithm 216 can make computations on productivity of a worker throughout a working shift. Notably, neither the HRMS nor the IVMS track productivity per se. However, the intelligence of the system can compute a measure of productivity based upon an analysis of the available data in the HRMS and IVMS data sources by understanding complex data relationships and correlations.

In yet another example, a scanning device that is used to track the movement of products in a warehouse management system (WMS) can provide a "split feed" to an IVMS to more strongly correlate data between the WMS and IVMS to facilitate elaborate and complex algorithms 216. Here, the scanner may not be part of the industrial vehicle system at all. However, operator utilization of the scanner can trigger an algorithm to draw a subset of vehicle data collected by the IVMS.

Different systems can also be utilized to confirm/verify/authorize/authenticate data from another system. For instance, scan data from a WMS can be utilized to verify that certain IVMS data belongs to a corresponding vehicle task/performance measure.

As yet another example, a particular performance measure 210 may not have a corresponding record in any of the data sets. Rather, the necessary data must be derived. For instance, a WMS may dictate a specification for a performance item. The analysis engine 114 (FIG. 1) can utilize the IVMS to fill in the specification from the WMS. Thus, the WMS may define a task, but leave it up to an interpretation of vehicle data collected by the IVMS to determine a measure of when a task begins and ends.

The above examples are not meant to be limiting, but rather illustrative of various techniques to extract information either directly or through associations, computations, etc. using available data.

With reference generally to FIGS. 2-4, due to the flexibility in vertical and horizontal scaling of the individual and group contexts, each logical organization can have its own unique performance profile 204. In this regard, each unique instance can differ not only in data values, but in the design and metrics addressed by each performance profile. That is, a performance profile 204 set up for individual operator identifications 202 can utilize the same or different performance measures compared to a performance profile 204 set up for a group, e.g., a team 206.

Figure 5:
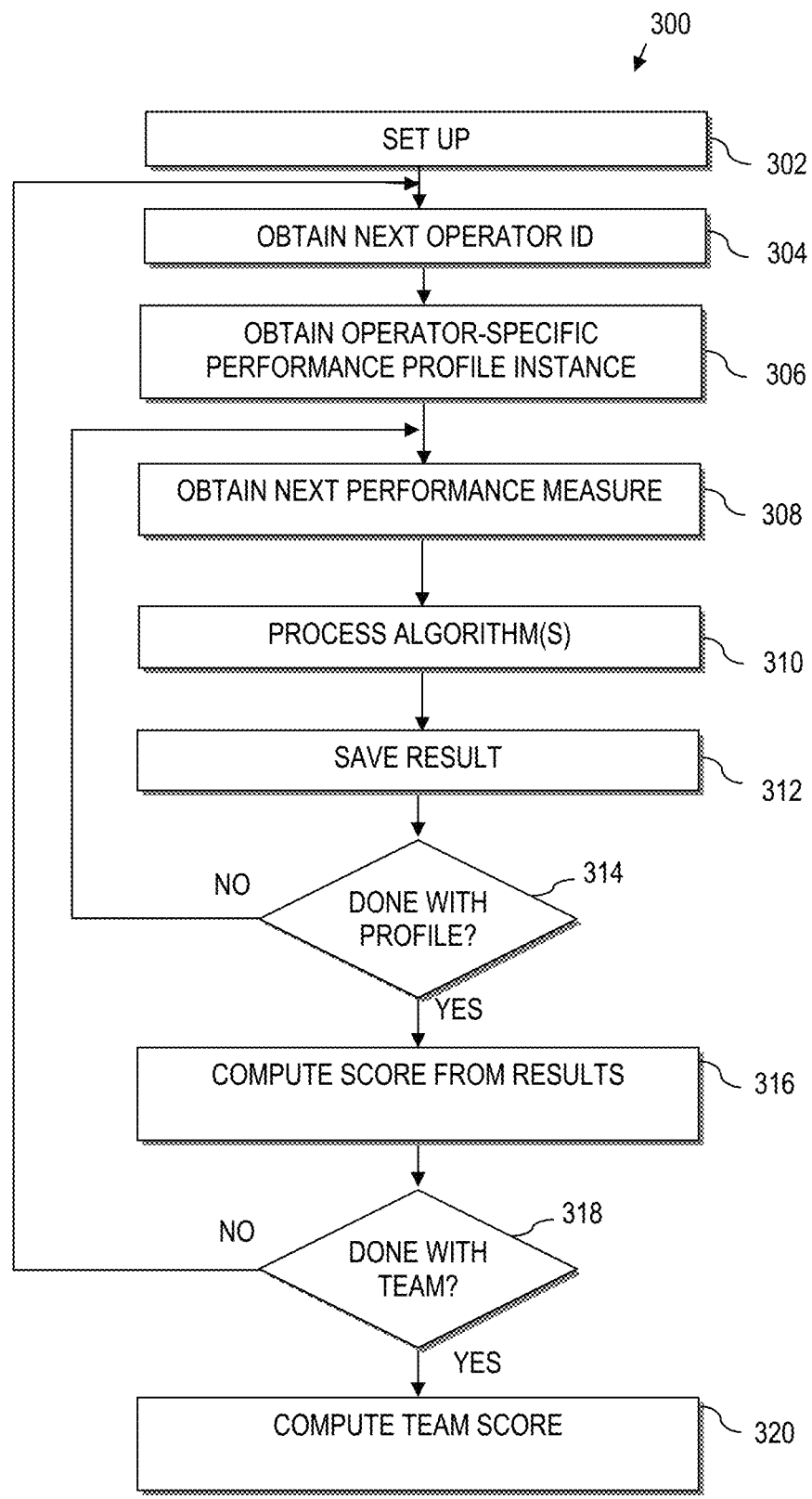
FIG. 5 is a flow chart of a method of associating performance profile instances with industrial vehicle operators, which may be utilized by the analysis engine of FIG. 1, according to various aspects of the present disclosure.

Measures of Industrial Vehicle Operator Performance:

Referring to FIG. 5, a flow chart illustrates a method 300 of computing operator scores by aggregating measures of industrial vehicle operator performance. The method 300 may be implemented by the analysis engine 114 of FIG. 1, using any combination of the features disclosed with reference to FIGS. 2-4, according to aspects of the present disclosure herein. In this regard, the method 300 may be implemented by computer code stored in memory, which is executed by a processor to perform the illustrated method steps.

The method 300 optionally performs a set up at 302. The setup at 302 includes coupling an analysis engine executing on a server computer to one or more data sources. Here, "coupling" includes direct connection, indirect connection, or otherwise having the ability to exchange information, such as using connectionless communication, e.g., by communicating over a network as illustrated in FIG. 1.

As noted in greater detail herein, the analysis engine 114 can access a first data source, such as an industrial vehicle management system that collects information about industrial vehicles (e.g., as represented by the industrial vehicle data 118 described with reference to FIG. 1). The first data source receives electronic vehicle information including industrial vehicle usage data collected from industrial vehicles during operation thereof, which is wirelessly transmitted from the industrial vehicles (e.g., to the first data source, as described more fully herein.

Moreover, for improved flexibility, the analysis engine 114 can access at least one additional, distinct data source, e.g., a second data source that collects information about a workforce. For instance, the second data source can collect data with regard to the transactions of materials within a location that are handled and moved by operators (e.g., the WMS data 120). Other examples of the second data source are described in the discussion of FIG. 1 and can include HRMS data 122, LMS data 124, etc.

The set up at 302 can also comprise storing a performance profile having a plurality of performance measures, each performance measure characterizing a measure of performance of an industrial vehicle operator (e.g., as described with reference to FIGS. 2-4). The set up at 302 also assigns one or more associations to the performance profile instance. In an example implementation, the set up at 302 also includes assigning a specific industrial vehicle operator identification to a copy of the performance profile to define an operator-specific performance profile instance, e.g., as described with reference to FIGS. 2-4.

In this manner, the setup 302 can also include setting up other necessary information, which may apply uniquely to a particular vehicle operator identification, or more generally across multiple instances of a performance profile, such as by setting up, creating, modifying or otherwise enabling definitions 212, thresholds 214 and algorithms 216 (FIG. 4). For instance, the setup at 302 can comprise customizing at least one performance measure of the operator-specific performance profile instance according to the assigned industrial vehicle operator identification.

The setup can also set weights to the various performance measures. For instance, the method 300 can implement a graphical user interface by displaying a list of the plurality of performance measures in the performance profile, and by providing a visual display configured to enable setting a weighting to each of the plurality of performance measures (see for instance, the example described with reference to FIG. 10).

In other examples, a group, e.g., a team, shift, location, etc., further is assigned to a performance profile instance. For instance, a group of industrial vehicle operator identifications can be assigned to a team such that at least one unique team is defined.

In practice, the method 300 can be used to compute operator scores across a plurality of operators. As such, the method 300 iterates through for one user, a group of users, etc. For sake of example, the method 300 is illustrated in a loop that computes operator scores for an entire team of operators.

The remainder of the flow chart 300 is described with reference to computing operator scores by aggregating measures of industrial vehicle operator performance at the individual operator identification level. However, the same flow can be applied to other layers of granularity, e.g., by replacing "operator ID" with "group ID", etc.

The method 300 evaluates a current state of the operator-specific performance profile instance by processing each performance measure based upon the assigned industrial vehicle operator identification, using information from the first data source and the second data source, such that both the first data source and the second data source are queried to obtain information necessary to evaluate at least one performance measure of the performance profile instance. The evaluation further includes computing at least one score for the operator identification based upon the evaluation of the performance profile instance.

In an illustrative implementation, multiple scores can be computed by computing a performance measure score for each performance measure and by assigning an associated performance measure threshold target to each performance measure. In this manner, outputting the current state of the operator-specific performance profile instance can include displaying a representation of each computed performance measure score relative to the corresponding assigned performance measure threshold target.

As such, regardless of the embodiment, the method 300 can further compute each score by (optionally) assigning a weight to each of the plurality of performance measures of the operator-specific performance profile instance (e.g., in the set up 302) and by computing a total score across the current state of the operator-specific performance profile instance based upon the weighted scores of each of the performance measures.

As described herein, the evaluation is based upon a "current state" to account for the dynamic nature of the underlying data. For instance, the first data source (e.g., the industrial vehicle database 118 of FIG. 1) is typically frequently updated, based upon the level of industrial vehicle usage in an environment. As such, new data that can be correlated to the industrial vehicle operator is continually generated simply by the operator performing assigned tasks. Thus, a score computed by an operator evaluation can vary over time (even during the course of a shift).

The method 300 obtains the next industrial vehicle operator identification at 304 and obtains the performance profile instance associated with the operator identification at 306 (operator-specific performance profile instance). Each performance measure of the obtained performance profile instance is then processed. For instance, the method 300 obtains the next performance measure at 308 and implements the various computations associated with the performance measure at 310. In an illustrative implementation, for the current performance measure, each algorithm is executed to process each associated definition. The results can be compared against any assigned threshold (examples of which are described with reference to FIGS. 2-4). If the performance measure being evaluated includes multiple definitions, thresholds, etc., a final overall performance measure result may also be computed. The results are saved at 312.

At 314, a decision is made as to whether all of the performance measures of the associated performance profile have been considered. If there are still performance measures to be computed, the method 300 loops back to 308.

Otherwise, the method 300 continues to 316 where a score is computed for the operator associated with the performance profile instance. The method 300 may further output a representation of the current state of the operator-specific performance profile instance.

In an illustrative example, the method 300 may define a window that limits the scope of data from the first data source and second data source that can contribute to evaluating the current state of the operator-specific performance profile instance. Here, the method defines an overall target based upon each performance measure threshold target and the defined window, and compares the computed performance measure score for each of the plurality of performance measures against its defined performance measure threshold target. The method further aggregates each computed performance measure score into an overall score, and outputs a representation of the overall score relative to the overall target. For instance, the method can output a dashboard view characterizing the current state of the operator-specific performance profile instance by displaying a representation of the overall score relative to the overall target.

If processing is performed at a group level, e.g., a team level, at 318, a decision is made as to whether all members of a corresponding team have been processed. If there are more members of a corresponding team, the method loops back to 304 to process the next operator. Otherwise, the method proceeds to 320 where an overall score is computed for the entire team. Likewise, if multiple teams are defined, the method 300 iterates until all teams (or any other group) has been processed. In this regard, the method 300 may further output a representation of each team score in a manner that allows direct comparison of each computed team score (e.g., as will be described with reference to FIG. 7).

The analysis engine 114 of FIG. 1 can process the method 300 of FIG. 5. Moreover, the analysis engine 114 can communicate the results of the scores to various users in various roles and contexts, e.g., by delivering the scores to executives, managers, supervisors, etc., operating a processing device 102 (as illustrated in FIG. 1). The analysis engine 114 can also provide the score for a given operator identification to the associated operator.

Still further, the analysis engine 114 can be used for customizing a threshold target for at least one performance measure of each operator-specific performance profile instance to normalize the scores computed for each team. For instance, in certain contexts, comparisons can be made more uniformly using normalized data. This allows for instance, an otherwise efficient worker to not be scored low due to the equipment or tasks assigned to that operator. By way of example, an operator on an older, slower industrial vehicle may have a lower target threshold of productivity compared to an operator of a newer, faster industrial vehicle. As yet another example, a team with all experienced workers may be held to a higher target threshold than a team of new, less experienced workers, etc.

Still further, the method 300 can provide attributions and detailed analysis information along with the computed scores. This allows a user viewing the data to understand why a score is computed. For instance, the method 300 may further perform attribution by analyzing each computed score against an associated threshold target, and by selecting at least one computed score based upon the analysis of each computed score. Here, the method 300 further comprises analyzing underlying data evaluated to derive each selected score and generating automatically, an indication of attribution that identifies a key indicator of the reason for the computed score.

The attributions can be in the format of affirmations, and optionally, indicators of performance. For instance, the method 300 can select at least one computed score based upon the analysis of each computed score, by automatically selecting at least one computed score that falls below a corresponding threshold and by automatically selecting at least one computed score that falls above a corresponding threshold. Here, an indication of attribution that identifies a key indicator of the reason for the computed score, is automatically generated in the form of an indication of a key indicator of a contributing factor for failing to meet the corresponding threshold and an affirmation identifying a contributing factor for meeting or exceeding the corresponding threshold.

Figure 7:
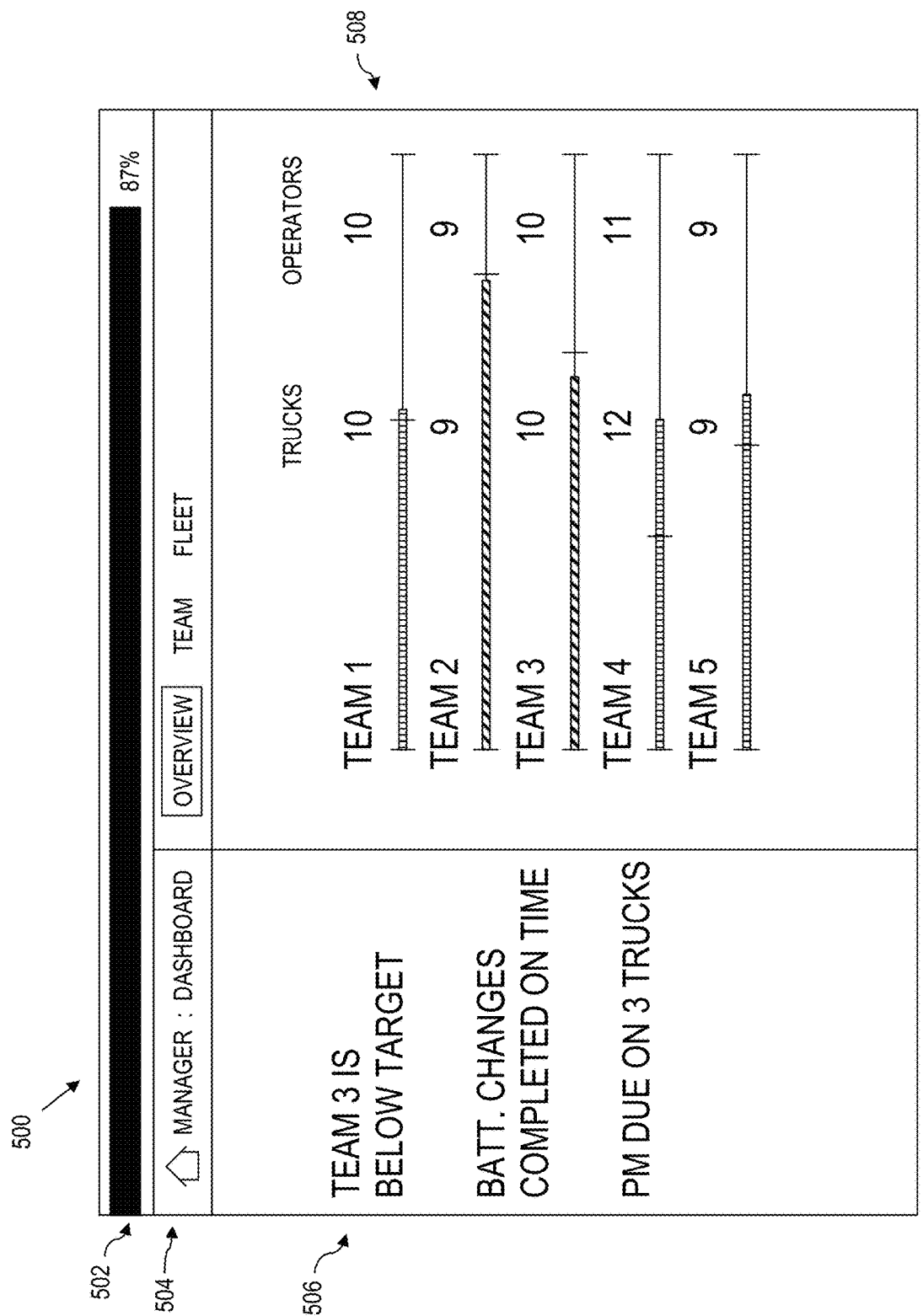
FIG. 7 is an exemplary manager view illustrating a workforce evaluation grouped by teams, which can be displayed on one or more processing devices of FIG. 1, according to aspects of the present disclosure.
Figure 8:
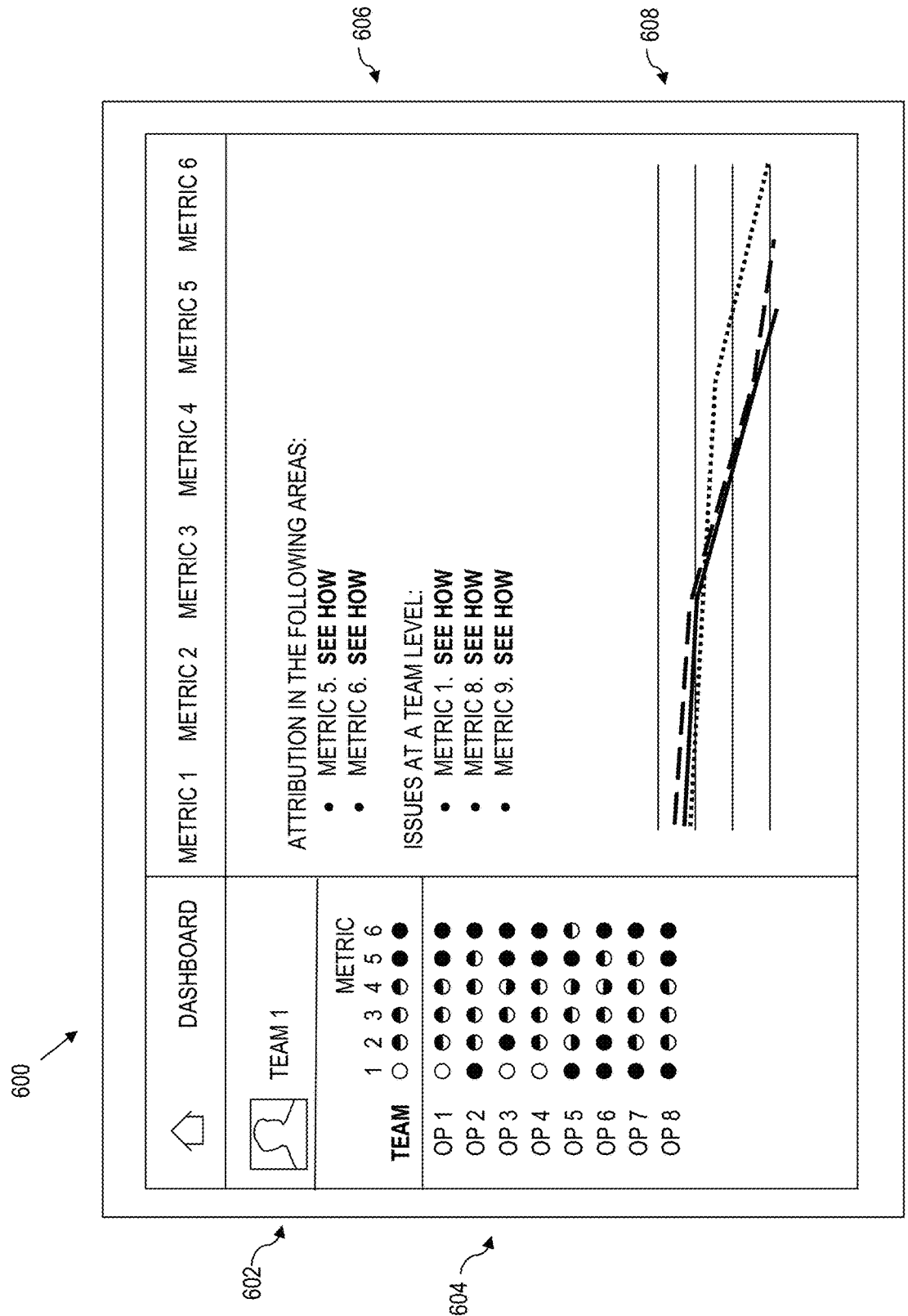
FIG. 8 is an exemplary supervisor view illustrating a workforce evaluation for a specific team, which can be displayed on one or more processing devices of FIG. 1, according to further aspects of the present disclosure.
Figure 9:
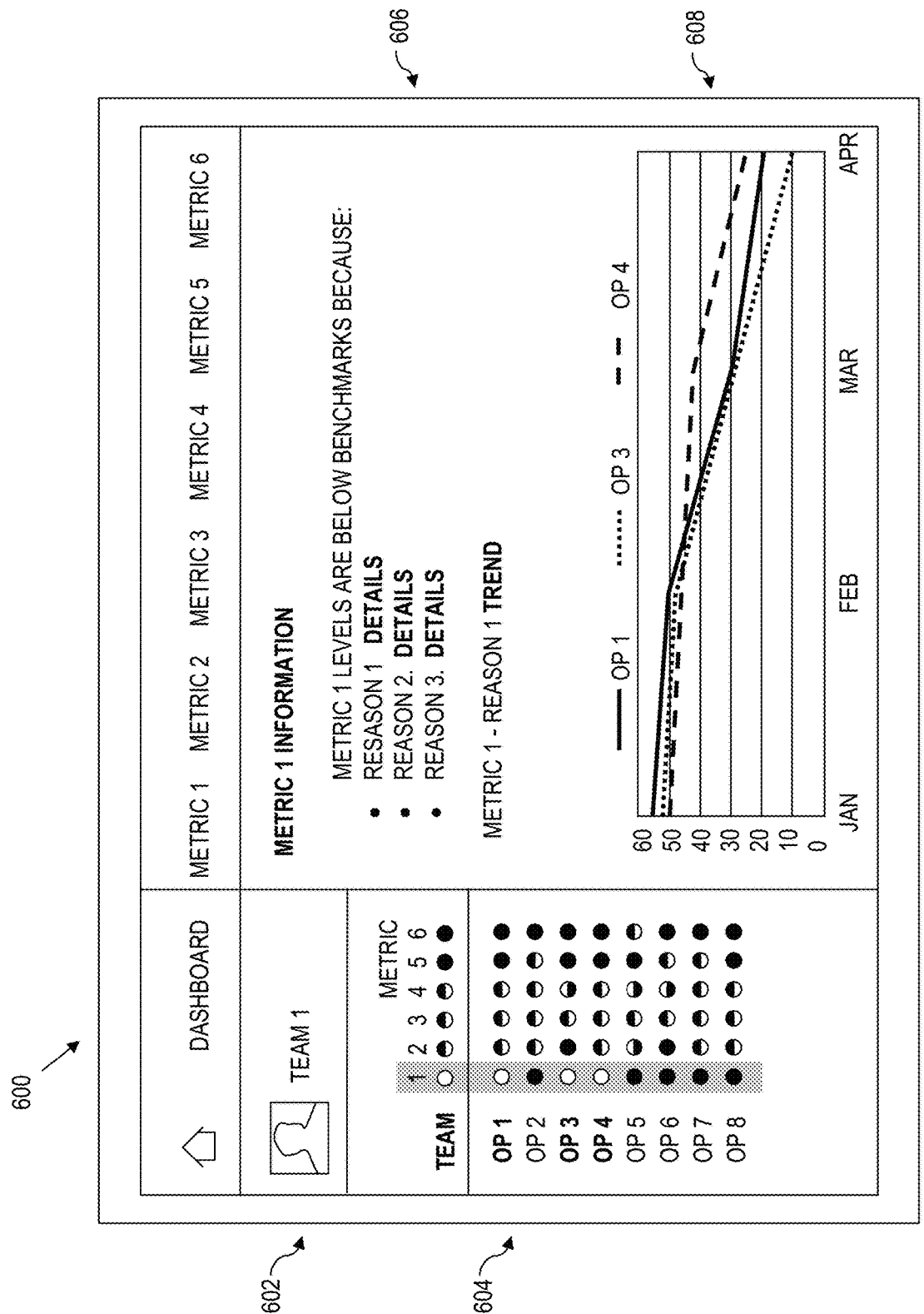
FIG. 9 is the exemplary supervisor view of FIG. 8 illustrating drill down capability, according to aspects of the present disclosure.

Examples of attribution are set out in the discussion of at least FIGS. 7-9.

The above approaches herein can be extended with various graphical user interface displays, examples of which are described more fully herein. For instance, the method may provide a user interface configured to enable a user to drill down into the underlying data used to evaluate the plurality of performance measures of the operator-specific performance profile instance. Other exemplary interfaces are described below.

Performance Profile Data:

According to various aspects of the present disclosure, a technical problem relates to how to compute and update the measures of operator quality. For instance, in typical applications, it is not unexpected for a particular operator to be able to operate more than one (or one type) of industrial vehicle. Moreover, vehicle operators are required to perform various tasks, which may be assigned by a specific system, such as a warehouse management system, which creates hurdles for third party software to normalize various vehicle operator performance issues into an assessment of workforce quality.

In this regard, aspects of the present disclosure provide a technical approach that utilizes various combinations of data capture, data integration and analysis to provide an automated and continuously updated scoring and information presentation application. Moreover, data capture and data integration are achieved across multiple domains, as noted above.

One aspect of the technical solution to the above-problem is to automatically collect vehicle usage information as a corresponding vehicle is being used in daily operations (e.g., see the industrial vehicle data 118 in FIG. 1. The vehicle usage data, along with data from at least one other source, is automatically correlated to a specific vehicle operator to capture an indication of the work performed by the vehicle operator.

As a few illustrative examples, with specific reference to FIG. 1, industrial vehicles 108 may each utilize an information linking device (such as the information linking device 38 as described in U.S. Pat. No. 8,060,400, entitled "FLEET MANAGEMENT SYSTEM", the disclosure of which is incorporated by reference herein) to collect data from the corresponding industrial vehicles 108. For instance, an information linking device on an associated industrial vehicle 108 automates the collection of information, such as the identity of the operator logged into the corresponding industrial vehicle 108 (i.e., the industrial vehicle operator identification 202), as well as operational parameter values of the corresponding industrial vehicle 108 that may vary over time, such as speed, temperature, battery state of charge, proprietary service codes, fork height, weight of load, detected impacts and other measurable and/or detectable parameters. For instance, the information linking device can access data from across the vehicle CAN bus, e.g., event codes, states of switches, temperature readings, encoder and controller data, etc. The information linking device can also collect data that relates to the actions of the vehicle operator. For instance, if a seat switch is depressed, the operator is sitting down. The information linking device can also collect vehicle operator data such as the manner in which the vehicle operator operates the industrial vehicle, e.g., how and when traction controls are engaged, how and when hydraulics are engaged, etc.

The information linking device on the industrial vehicle 108 may also further automatically track: when an operator is logged onto an industrial vehicle 108; when the operator is on or off the platform of the industrial vehicle 108; when the industrial vehicle 108 is moving; the industrial vehicle status while the vehicle is in motion; etc.

The collected industrial vehicle data is wirelessly communicated to the server 112 and is stored as the industrial vehicle data 118. For instance, the server 112 of FIG. 1 may include server software such as the mobile asset application server 14 as described in U.S. Pat. No. 8,060,400 and the industrial vehicle data database 118 of FIG. 1 may store information related to industrial vehicles in a data resource 16 as described in U.S. Pat. No. 8,060,400.

According to further aspects of the present disclosure, a further technical problem relates to how to manipulate data from different and unrelated data sources into cohesive information that can be utilized to assess operator quality, or some other measure that is not inherent to any of the underlying data sources.

Some examples of data integration are discussed above. However, as a few additional examples, with reference back to FIG. 1, the information linking device on an industrial vehicle 108 provides the ability to measure when an industrial vehicle 108 is in use, but cannot always determine when the industrial vehicle 108 is active performing work. For instance, merely driving the industrial vehicle 108 may not constitute "work". However, knowledge of the information generated and stored in the industrial vehicle data 118 can be correlated with task information stored in the WMS data 120 to identify that travel of the industrial vehicle 108 was (or was not) in furtherance of the completion of a work-based task, thus constituting work that generates a score. Comparatively, driving the industrial vehicle 108 to a break room may not constitute work that contributes to the score, despite the fact that the data in the industrial vehicle data 118 indicates use of the industrial vehicle 108.

As yet another example, a WMS system may instruct a worker to perform a pick operation, e.g., pick up a pallet from a designated rack position. The WMS data 120 knows the rack location and the SKU of the pallet to be picked up. The WMS data 120 also identifies when the pallet was scanned as picked up, and when the pallet was scanned as being dropped off. However, the WMS data 120 may have no idea as to the energy used by the industrial vehicle to pick up the pallet, or whether the vehicle operator traveled the most efficient course, etc. Moreover, the WMS data 120 has no information that characterizes the worker actions that were executed to implement the pick operation. The industrial vehicle data 118 however, knows the direction and travel of the industrial vehicle 108 used for the pick operation. The industrial vehicle data 118 knows how high the forks were raised, how fast the operator was driving, the weight of the pallet, whether there was an impact with the industrial vehicle, etc. The industrial vehicle data 118 may also know the energy usage for the pick operation. As such, domain knowledge of both these independent systems can provide information used to compute a performance measure, despite the performance measure being defined in a way that cannot be measured directly by data from any one source.

As yet another example, one aspect of a productivity measure 210 may be a measure of how many controlled motions an industrial vehicle operator performed to complete a given task. This may demonstrate familiarity with vehicle controls, awareness of job responsibility, confidence, misuse, etc.

Thus, the operator score may reflect not only successful completion of the pick operation, but also the skill at which the operator performed the operation.

Moreover, the industrial vehicle data 118 may know the various industrial vehicle specifications. For instance, the industrial vehicle data 118 may characterize maximum speed, load capacity, fork raise height, etc. Thus, the capability of each industrial vehicle 108 may also be known. This allows a supervisor or manager to adjust the threshold (see 214 of FIG. 4) at the vehicle or operator level, e.g., so that an operator score is not adversely affected by using an older/slower vehicle, etc. Other "normalizations" can also/alternatively be built into the system so that vehicle operators, teams or other groups can be evaluated in an appropriate context.

In summary, the WMS database 120 stores data related to the movement and storage of materials (transactions) within an operation, e.g., from a warehouse management system that knows about the movement of materials within a facility. The movement of materials can be carried out with the industrial vehicles 108 that provide data to the industrial vehicle data database 118 of FIG. 1. In the exemplary system, the WMS database 120 is linked either directly or indirectly to the industrial vehicle operator identification 202 so as to tie the associated WMS transactions to the industrial vehicle operator identification 202. Similarly, the HRMS database 122 and LMS database 124 store information that is linked to specific industrial vehicle operator identifications 202.

According to aspects of the present disclosure, the performance measures are conceptually broken down into "What" and "Why" considerations.

Issues such as productivity, mispicks/mistakes and attendance/compliance can be addressed by querying systems such as the WMS 120, HRMS 122 and LMS 124. The "Why" of these questions can be answered with industrial vehicle information collected and stored in the industrial vehicle information database 118. Moreover, industrial vehicle data can be used to answer both the "What" and the "Why" as to performance measures such as skill, impacts, truck care, energy/battery usage, semi-automated usage, and teamwork. In this manner, a score can be computed for an operator by considering the aggregate of values in the what (criteria 212) and the why (algorithm 216) can provide explanations for each performance measure 210.

According to aspects herein, key information provided across a range of hardware is utilized to inform different users of the system 100 in their unique contexts. For instance, supervisors, managers and operators have different information needs driven by their roles. Moreover, different types of information is provided to satisfy different contexts, etc.

Referring to FIGS. 1-5 generally, in an illustrative implementation of the disclosure herein, measures of industrial vehicle operator performance are aggregated by facilitating communication between the analysis engine 114 and a data source, preferably two or more distinct data sources (see FIG. 1) and by performing the method of FIG. 5 in accordance with the structures described with reference to FIGS. 2-4.

In an illustrative implementation, a first dashboard view is generated in response to a request from a first user. The first dashboard view is generated by evaluating the performance profile instance 204 of a vehicle operator, group of vehicle operators, etc., as described more fully herein. More particularly, each performance measure 210 is processed by causing the analysis engine 114 to query, based upon the assigned industrial vehicle operator identification 202, the first data source (e.g., data source 118) and the second data source (e.g., at least one of 120, 122, 124, etc.) such that the first data source and the second data source are each queried at least once in the evaluation of the performance profile instance 204.

The first dashboard view is further generated by computing a first score based upon the evaluation of the performance profile instance 204, comparing the first score to a first predefined threshold target 214 or other threshold as described in greater detail herein, and outputting a representation of the first score relative to the predefined threshold target, for viewing by the first user.

In an illustrative implementation, a score is computed for each industrial vehicle operator identification 202 within a group (e.g., a team 206), as described more fully herein. Moreover, the scores of individual team members is aggregated into an overall team score, which is compared to a team threshold. The above is extensible to groups of teams, shifts, facilities, etc. With the computed scores, the system generates several views of the data. Examples of various views and various roles presenting the data at different granularities, are described in greater detail below.

Attribution:

According to yet further aspects of the present disclosure, a technical problem relates to how to interpret and address operator quality scores. As noted more fully herein, the system herein can generate different views that each ultimately aggregates a plurality of operator performance measures into one or more scores. However, understanding the score may not be easy to for a given manager.

As noted in greater detail herein, the methods herein can analyze underlying data that was considered in deriving selected scores and can automatically generate an indication of attribution that identifies a key indicator of the reason for the computed score.

Moreover, dashboard views are configured to tell the user what matters, and what to do about it. The decision as to "what matters" and "what to do about it" can be derived from machine intelligence, through pre-programmed "mechanisms", etc.

For instance, in an exemplary implementation, a mechanism chooser presents a plurality of options available to the user. The user can then custom configure (or work from defaults) so that a particular application can be customized to select information that matters the most to a given circumstance. In an illustrative implementation, the user also sets the various thresholds.

With reference to FIGS. 1-5 generally, the thresholds determine what critical information is driven up the dashboard. For instance, as noted in greater detail above, each performance profile 204 can have an overall threshold. However, the performance profile 204 is made up of performance measures 210, each of which may have one or more thresholds. By evaluating how close to being on target, what comparisons are over the threshold, under the threshold, etc., the degree of being over/under each threshold, the system can make intelligent decisions on which aspects of operator performance should be percolated to the summary level of the particular dashboard view. For instance, as an illustrative example, the system can select the highest rated/scored and lowest rated/scored measures for display, and tag lines can be generated to describe these scores in the dashboard view using short but meaningful statements.

Still further, the system can monitor historical performance against thresholds and make recommendations to threshold levels. Also, by mining underlying data, the system can recommend what the threshold values should be, e.g., by looking for averages, trends, etc. in the underlying historical data.

Also, when displaying results in a graphical user interface, critical information can be presented in a short-term action section and/or long-term action section, e.g., based upon user-derived preferences that are (or even are not) based upon the underlying data. For instance, the system can aggregate the data and add something else of interest to the consideration. As an example, a summary can be based upon an aggregation of a performance profile, with a particular emphasis on impacts. As another illustrative example, the "something else" may not be native to the underlying data. Rather, information such as time of day, operator role or interest, viewing habit, identity of the particular user, etc., can be used to prioritize initial summary level data to be displayed. Also, filters can be set up to prevent or specifically require certain types of data to be considered for presentation in the short-term action section and/or long-term action section.

For instance, in the role of compliance checking, the system can filter out non-compliance measures, etc. The user can then navigate through the data drilling up and down through levels of detail to understand the presented summary level information. Thus, in illustrative implementations, (and for any of the dashboards herein), the short-term action section and/or long-term action section can be dynamically variable and user-modifiable.

Still further, the visual indicia can be accompanied by text that provides additional support, information or other descriptions. In an example implementation, a natural language processor is used to facilitate text information and drill down information presented to the user. The natural language processor (e.g., within the analysis engine 114) can also select the verbiage that is presented in the summary section based upon the state (current, historical or predictive) of the data.

Upgrade Recommendation:

Referring to the FIGURES generally, in an exemplary implementation of a view of the management or executive information, the analysis engine 114 (FIG. 1) receives hypothetical fleet upgrade data, e.g., from a remote manufacturer database system. The analysis engine calculates hypothetical average threshold values based at least in part on hypothetical fleet upgrade data and the data received from fleet of industrial vehicles and perform a comparison of team performance measures and hypothetical average threshold values to determine if team or operator performance could be increased through a vehicle upgrade. The view allows communication to supervisors or executives to recommend fleet adjustment recommendations.

Figure 6:
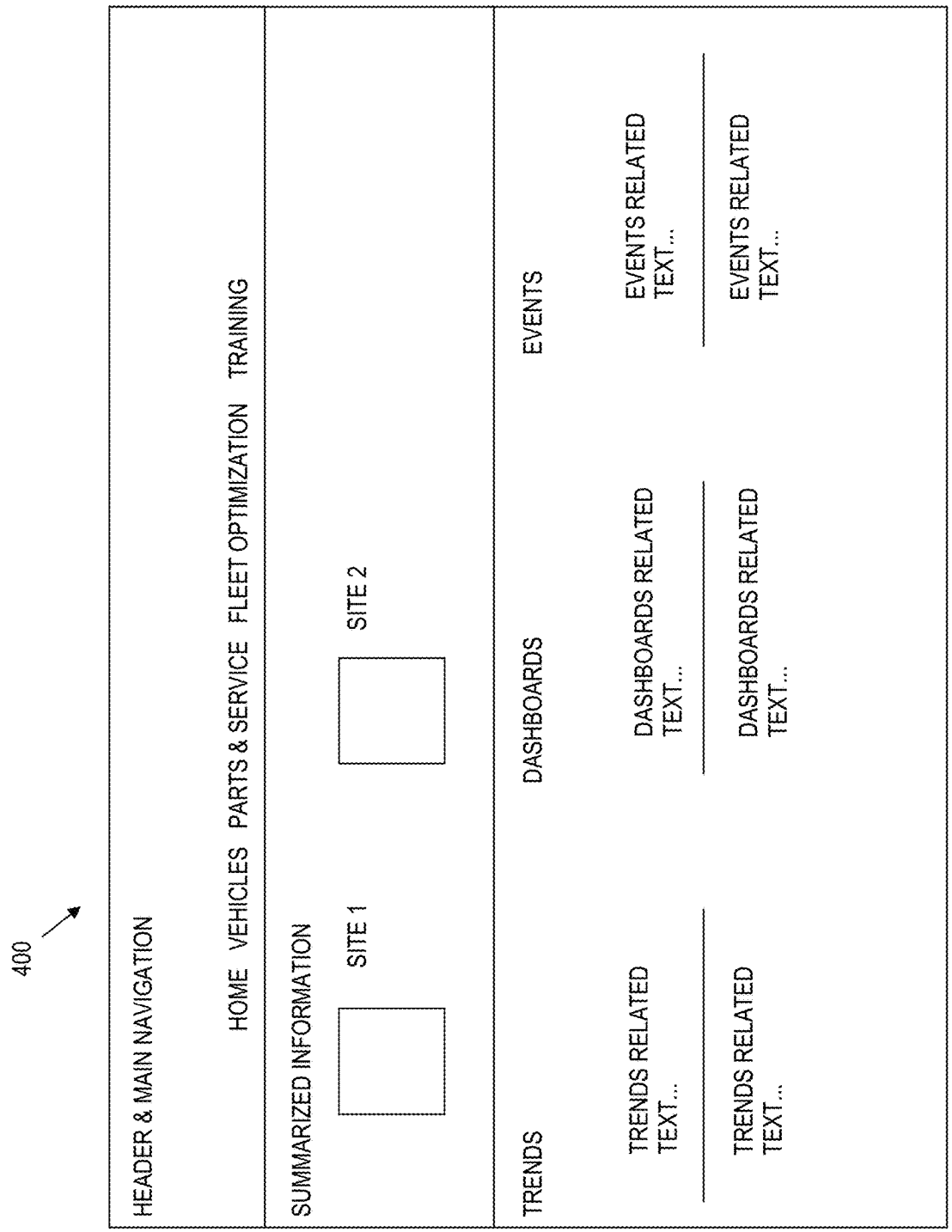
FIG. 6 is an exemplary summary view, which can be displayed on one or more processing devices of FIG. 1, according to various aspects of the present disclosure.

Executive:

Referring to FIG. 6, an executive that interacts with exemplary systems described herein, is provided with a graphical executive interface 400 (dashboard view), such as via a conventional web browser, client, etc. Because of the unique role an executive plays in the daily operation of a facility, the executive interface 400 includes information that is of summary form and at levels that relate information for financial decisions. For instance, the graphical executive interface 400 is used to provide high level, location averaged information, such as by identifying the highest ranked location and the lowest ranged location of an operation. The graphical executive interface 400 can also be utilized to show the executive trends, real-time performance dashboards, messages, fleet statistics and fleet utilization of the industrial vehicles operated by the organization, operator training, etc. Here, the underlying data is generated as described above with reference to FIGS. 1-5. However, as the data for each performance profile is further grouped into teams, locations, etc., different thresholds are applied to present information to the executive in a format for making executive level decisions. For instance, as noted above, different threshold and scoring algorithms can be set up for different roles within an organization. Thus, groups can be set up to allow executives to evaluate managers and supervisors based upon the performance of their team members.

Manager:

Referring to FIG. 7, an exemplary manager interface 500 is illustrated, which presents information, e.g., generated by the analysis engine 114 of FIG. 1, according to combinations of the approaches set out with reference to FIGS. 2-5.

A manager interacts with the system described herein via a graphical manager interface 500 (dashboard view). The graphical manager interface includes four main sections including a performance score status section 502, a menu section 504, a summary section 506 and a details section 508. The performance score status section 502 provides the manager with a visual representation of the overall score of the supervisors/teams under the manager's responsibility. In the illustrative example, the performance score status section 502 illustrates an overall score of 87%. The menu section 504 allows the manager to utilize the details section 508 to see various scores. For instance, multiple overall team scores are graphically illustrated along with unique thresholds set for each team. The scores can be computed as set out in FIG. 5. The user can also drill down into various sub-categories of data, such as an overview, team organization, industrial vehicle fleet information, etc.

The summary section 506 provides glanceable, actionable information. In the illustrative example, the summary information is historically presented in chronological order. The information that is selected to be displayed is based upon alerting the manager to the most relevant aspect to be addressed, e.g.., the attributions described with reference to FIG. 5.

As illustrated within the details section 508, each team is assigned a unique team target that represents the desired target overall threshold (e.g., target score) for the team members. As illustrated, the threshold is represented by the "tick". For instance, a team with less members, e.g., a third shift team, may have less total output than a team with more members and thus may receive a lower team target. As another example, a team with experienced operators may be held to higher productivity output compared to a team of newer members and thus receive a relatively higher team target. Still further, a team with access to older industrial vehicles may not have the same output capability as a team with access to newer industrial vehicles and may thus be held to a relatively lower team target.

In the illustrated example, the details section indicates that Team 1, Team 4 and Team 5 are all exceeding their assigned target, as indicated by the associated bar graph (e.g., visually presented in vertical cross hatch), and extending past the target "tick" on the graph. Team 2 and Team 3 are each below their target, as illustrated by a bar graph (e.g., visually presented in angled cross hatch), stopping short of the associated target "tick" mark on the graph. Team 3 is the furthest off target, so Team 3 is identified in the summary section 506 as the call to attention. In this example, since both Team 2 and Team 3 are near their respective target, the visual indicia may use a color, such as yellow. A red visual graph can be used for teams that are significantly off from their assigned target, whereas a green visual graph can be used for teams that exceed their target. Thus, the attribution capabilities of the analysis engine herein recognized that, in the context of the current view, team 3 was the furthest off from meeting their unique target threshold, so an attribution was raised to this point. Also, the teams were each able to score high on a performance measure related to battery changes, so a positive affirmation is provided, indicating to the manager that the teams have completed their battery changes on time. Also, the manager is warned that planned maintenance is due on three trucks. This allows the manager to adjust the performance profiles to account for the fact that trucks will be out of commission during their ordinary maintenance.

Supervisor:

Referring to FIG. 8, an exemplary supervisor interface 600 is illustrated, which presents information, e.g., generated by the analysis engine 114 of FIG. 1, according to combinations of the approaches set out with reference to FIGS. 2-5.

The illustrative supervisor interface 600 is implemented as a primary dashboard view that is logically organized into a menu section 602, a performance score section 604, a short-term action section 606 and a long-term action section 608.

The menu section 602 provides menu options to select various teams managed by the supervisor and to select individual performance measures to drill down into the details of specific performance measures to uncover the reasons for the presented scores.

The performance score section 604 provides a dashboard-style view that presents the team and individual contributor level performance score (as computed using combinations of the method set out with reference to FIG. 5) across the performance measures. The scores are displayed using any suitable manner, such as by alpha-numeric or graphical/visual icon. Moreover, the supervisor can drill down to specific performance measures for specific team members by navigating this view. For instance, the team and individual contributor level performance scores across the selected performance measure can be highlighted, or contrarily, the remaining non-selected performance measures can be muted, or reduced in contrast, focus or other format.

Accordingly, the supervisor has access to hierarchically generated scores that branch top down from the team to the individual, from the individual to particular performance measures, and from particular performance measures to individual criterion that make up each performance measure.

The short-term action section 606 provides attributions (e.g., as described with reference to FIG. 5). Here, the attributions are implemented as summarized calls to action, which may be positive reinforcement of team member performance, or a call to action may be negative of team member performance. In the illustrated example, bolded information can be used to drill down into the specifics of what the issue is, and what corrective action needs to be performed. As noted with reference to FIG. 4, the specifics are derived based upon the particular algorithm 216 associated with the performance measure 210 of interest. Also, each algorithm 216 itself can be comprised of multiple subparts, which require data to be extracted from one or more of the databases, e.g., 118, 120, 122, 124, etc., within the data source 116 (FIG. 1).

Because the analysis engine has domain level knowledge across multiple different domains, the analysis engine provides the necessary drill downs to the underlying information behind the presented scores, and also serves as an instructional tool to provide the supervisor with the necessary understanding of how to implement corrective, supportive, reactive or other responsive measures. For instance, as illustrated, the interface prompts the supervisor to learn how to improve team and individual scores in the areas of impacts and truck care using the bolded "see how" links. The information displayed in the short-term action section 606 can comprise any combination of text, graphic displays, graphs, charts and other visual metaphors for the underlying data and content to be conveyed.

The long-term action section 608 provides longer term trend information for performance measures that are of particular interest to the supervisor. The long-term action section 608 can also be utilized by the analysis engine 114 (FIG. 1) to prompt the supervisor through the interface, to learn how to react to the presented scores, such as by learning how to follow specific performance measures as illustrated in this non-limiting example using the "see how" links. The information displayed in the long-term action section 608 can comprise any combination of text, graphic displays, graphs, charts and other visual metaphors for the underlying data and content to be conveyed.

Referring to FIG. 9, as noted above, the supervisor can use the supervisor interface 600 to drill down through pages that provide increasingly greater details of an area of interest to explore the reason for various presented scores. For example, the supervisor can drill down into a productivity performance measure. In this manner, the top level navigation menu 602 indicates that the Supervisor has navigated to the Productivity drill down from the Primary Dashboard View. Also, the Productivity section of the performance scores section 604 (shown as metric 1) is highlighted. Moreover, the short-term action section 606 and the long-term action section 608 provide information in graphical dashboard form and in short form text that can be viewed and comprehended quickly and easily. For instance, phrases summarize the reasons for the performance measure score, with indicia (bolded Details prompt in the illustrative example) that allows further drill down into the underlying data.

The detailed drill down spells out key productivity metrics that are below benchmark levels, and can be used to indicate the root cause of the issues driving the Productivity scores. For instance, the exemplary performance measure "Productivity" is comprised of at least three different criteria. Based upon a user-configured threshold, the system indicates that three members of Team 1 are not meeting an established threshold. The long-term action section 608 provides a graph highlighting the three operators (OP 1, OP 3 and OP4 in this example) that have fallen below the threshold for the first metric. This is also noted in the performance scores section 604 by the visual indicator that OP1, OP3 and OP4 have unfilled in circles in the metric 1 column. The supervisor has the option to dig even deeper by clicking through one or more levels of details, e.g., by clicking on the bolded "Details" link.

Figure 10:
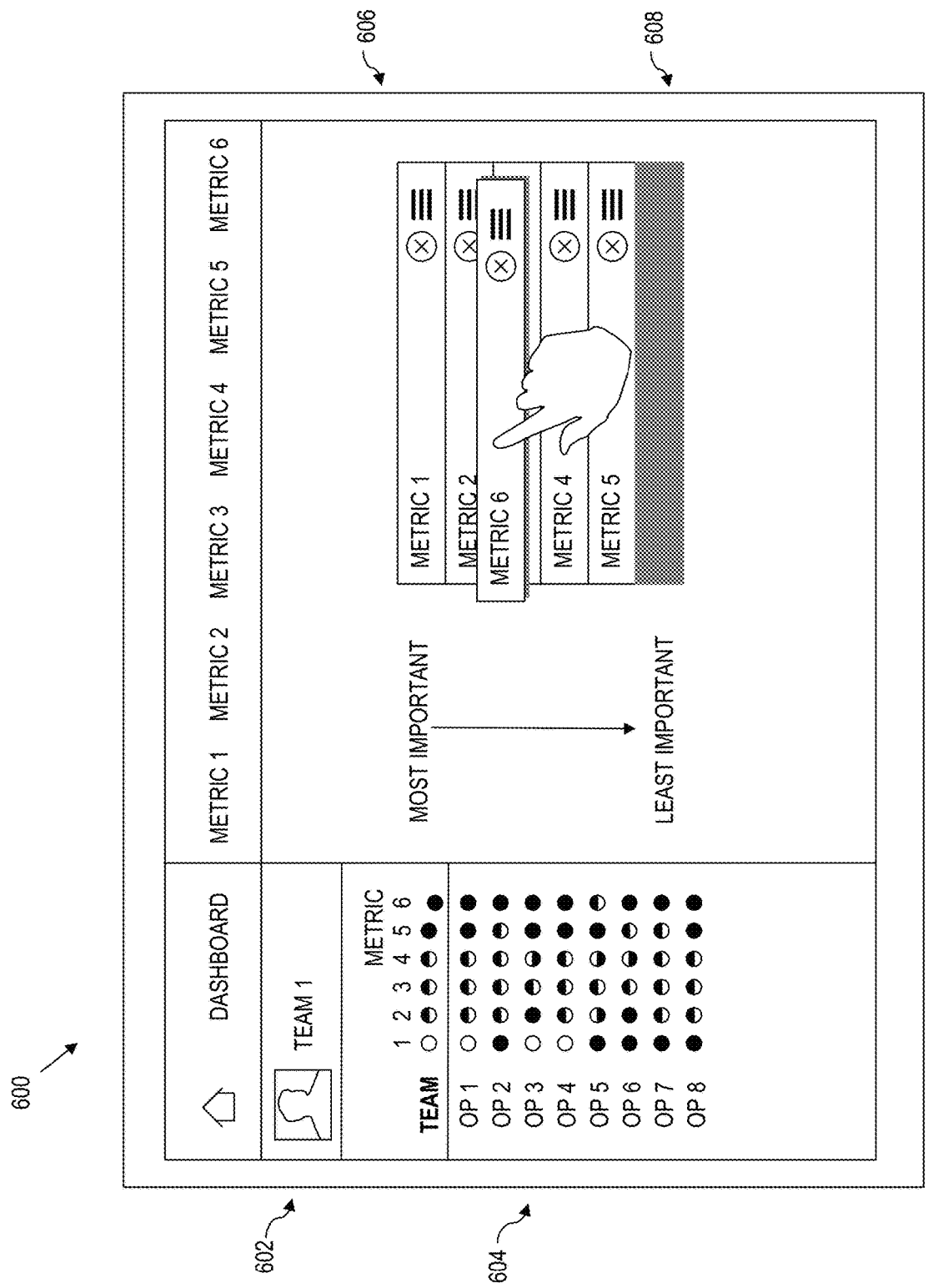
FIG. 10 is the exemplary supervisor view of FIG. 8 illustrating a supervisor assigning a priority and weight to performance measures of a performance profile, according to aspects of the present disclosure.

Referring to FIG. 10, according to aspects of the disclosure herein, the supervisor can decide which of the performance measures are most important to a particular analysis. In an exemplary implementation, the supervisor establishes a relative rank by sorting the utilized performance measures, e.g., from most important to least important. Moreover, the supervisor assigns/adjusts a relative weight to each performance measure so that the various performance measures contribute unevenly to the overall performance score achieved by each team member and/or by the associated team. As illustrated, the supervisor interface 600 allows the supervisor to edit the preference/order of the performance measures by graphically re-ordering the performance measure list. Individual measures can be added, deleted, modified, etc. Still further, in certain illustrative implementations, performance measures can be turned on and off. Here, a user may opt to still view the resulting evaluation of a performance measure that is turned off. However, that performance measure will not contribute to the overall weighted score for a performance profile, team, etc. Alternatively, the performance profile that has been turned off can be removed from consideration and viewing.

Moreover, as described with reference to FIG. 4, each performance measure 210 may itself comprise one or more individual criteria specified in a corresponding definition 212. The display can further be used to sort/prioritize each criterion in relative order of importance and/or otherwise weighted, so that the various criteria that make up a performance measure 210 do not contribute equally to the overall performance measure score. Also, the supervisor can drill down into the threshold settings to adjust the trigger threshold levels via the thresholds 214. Still further, the supervisor may have some ability to influence the algorithm 216, e.g., to map plain English criterion to a corresponding query (or queries) against the one or more data sources 116.

Figure 11:
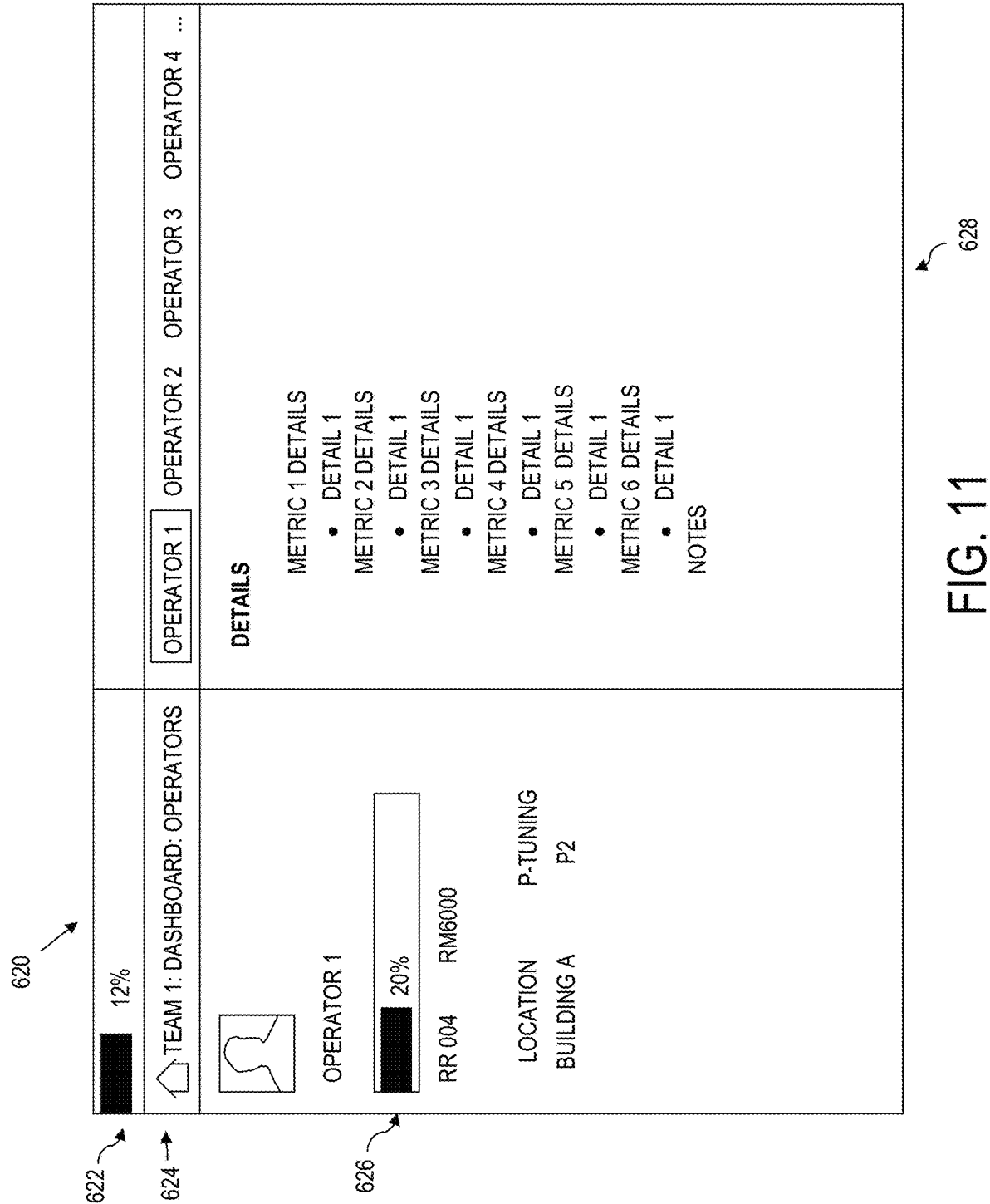
FIG. 11 is an exemplary supervisor view illustrating drill down capabilities into the performance details of a specific industrial vehicle operator, which can be displayed on one or more processing devices of FIG. 1, according to aspects of the present disclosure.

Referring to FIG. 11, the approaches herein can be combined in any desired manner to provide glanceable and actionable information for supervisors. For instance, a supervisor real-time interface 620 is illustrated, which can be used to drill down to the real-time information of a specific operator. In this example, the supervisor real-time interface 620 includes four main sections including a performance score status section 622, a menu section 624, a summary section 626 and a details section 628. The performance score status section 622 provides the supervisor with a visual representation of the overall score of the team under the supervisor's responsibility. In the illustrative example, the performance score status section illustrates a score of 12%. Since the view is a real-time dashboard view, the low percentage could be because the team just started a shift. The performance score status section 622 thus tracks the team throughout the work shift and updates the team score periodically, e.g., in real-time or near real-time.

The menu section provides the supervisor with the ability to select different team members to drill down into the performance of each member of the team.

The summary section 626 provides real-time visibility of the operator, indicating the industrial vehicle 108 that the operator logged into (using the operator's assigned industrial vehicle operator identification 204)—RR004 in this example, the location of the operator within a facility (if location tracking is utilized)—Building A in this example, and the performance level (P-Tuning) of the operator—P2 in this example. The performance level is an indicator of the skill of the operator, and can affect the abilities/functions available by the corresponding industrial vehicle, an example of which is set out in U.S. Pat. No. 8,060,400, already incorporated by reference herein.

Here, the selected operator has an overall current score of 20% indicating that the selected operator is outperforming the overall team (which is only at 12% in this example).

The details section 608 provides the various performance measures 210 associated with the performance profile 202 associated with the operator, as well as the score for each performance measure 210. The detail section 608 also provides for each performance measure 210, a short, glanceable summary that provides a summary of the "Why" associated with each score.

The supervisor can also be reactive and scale information accordingly. As an illustrative example, the system has the ability to receive data from the fleet of industrial vehicles, including receiving impact data and position-related data from the industrial vehicles. The industrial vehicle operators report to the supervisor that the impacts are caused by an environmental condition, e.g., a crack in the floor. As a result of determining a presence of an environmental hazard based on the impact data and position-related data, the supervisor can quarantine the bad location (the crack in the floor) and arrange to have the bad location addressed/fixed. The supervisor can then weight impacts that occur in this area so as to not carry the same weight as an actual impact (e.g., by setting up a definition that includes criteria related to warehouse position, impact measurement, time, etc.). Moreover, the supervisor can provide warnings to the vehicle operators to watch out for the crack, e.g., to slow down, avoid the area, etc.

Figure 12:
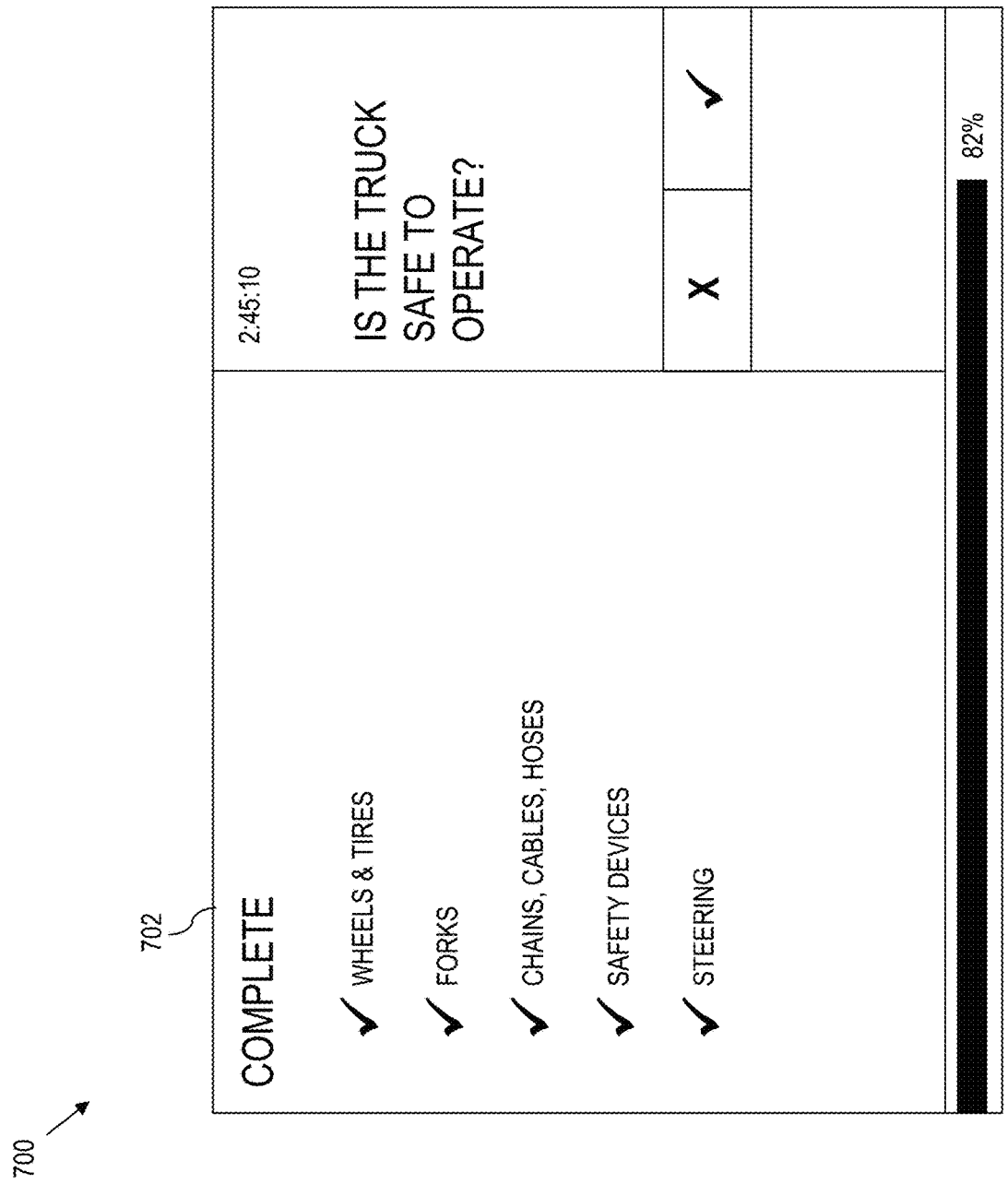
FIG. 12 is an exemplary operator view illustrating a pre-use inspection checklist, which may be displayed on an industrial vehicle as illustrated in FIG. 1, according to aspects of the present disclosure.

Industrial Vehicle Operator:

Referring to FIG. 12, an industrial vehicle operator interface 700 is provided as a display on an industrial vehicle 108 (FIG. 1) to provide information to the vehicle operator. The industrial vehicle operator interface 700 includes a plurality of views that each allow the operator to interact with the system to see information that assists the operator in performing assigned tasks. In a first view 702, the industrial vehicle operator interface 700 can implement a pre-shift inspection checklist, examples of which are described in U.S. Pat. No. 8,060,400, which is already incorporated by reference herein.

Figure 13:
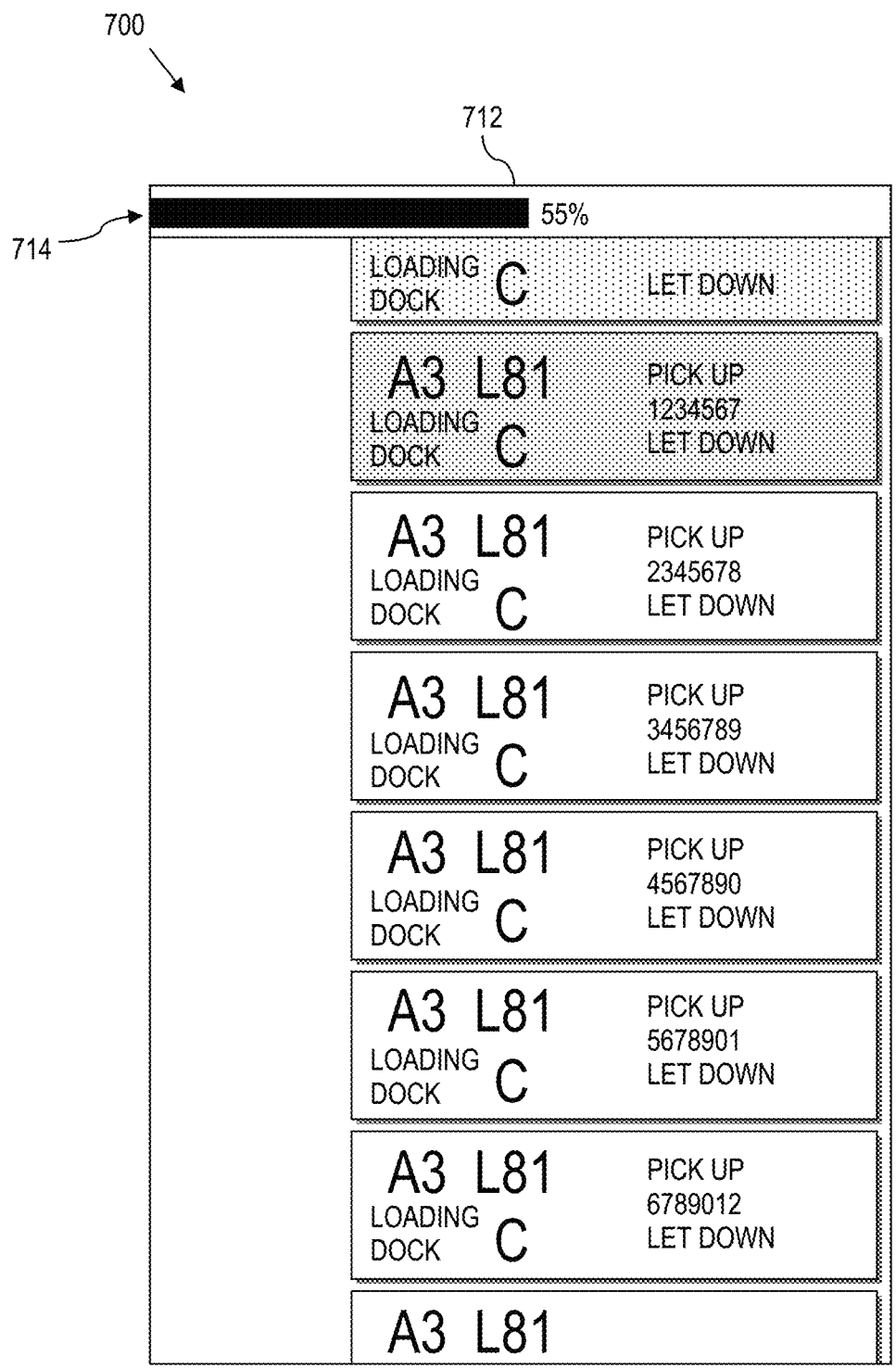
FIG. 13 is an exemplary operator view illustrating a task list, which may be displayed on an industrial vehicle as illustrated in FIG. 1, according to aspects of the present disclosure.

Referring to FIG. 13, a second view 712 provides a view of the work expected to be completed by the operator. With reference briefly back to FIG. 5, the method 300 may output a representation of the current state of the operator-specific performance profile instance by outputting to a vehicle operator display, a graphical representation of the current state of the operator-specific performance profile instance as a progress meter that identifies the progress of the operator in view of tasks to be completed, where the tasks are defined in the performance measures of the operator-specific performance profile instance. In the illustrative example of FIG. 13, a progress meter 714 extends across the top of a view illustrating to the operator, the overall progress of the tasks queued up to be completed. The view highlights the current task and displays a running list of one or more future jobs.

Figure 14:
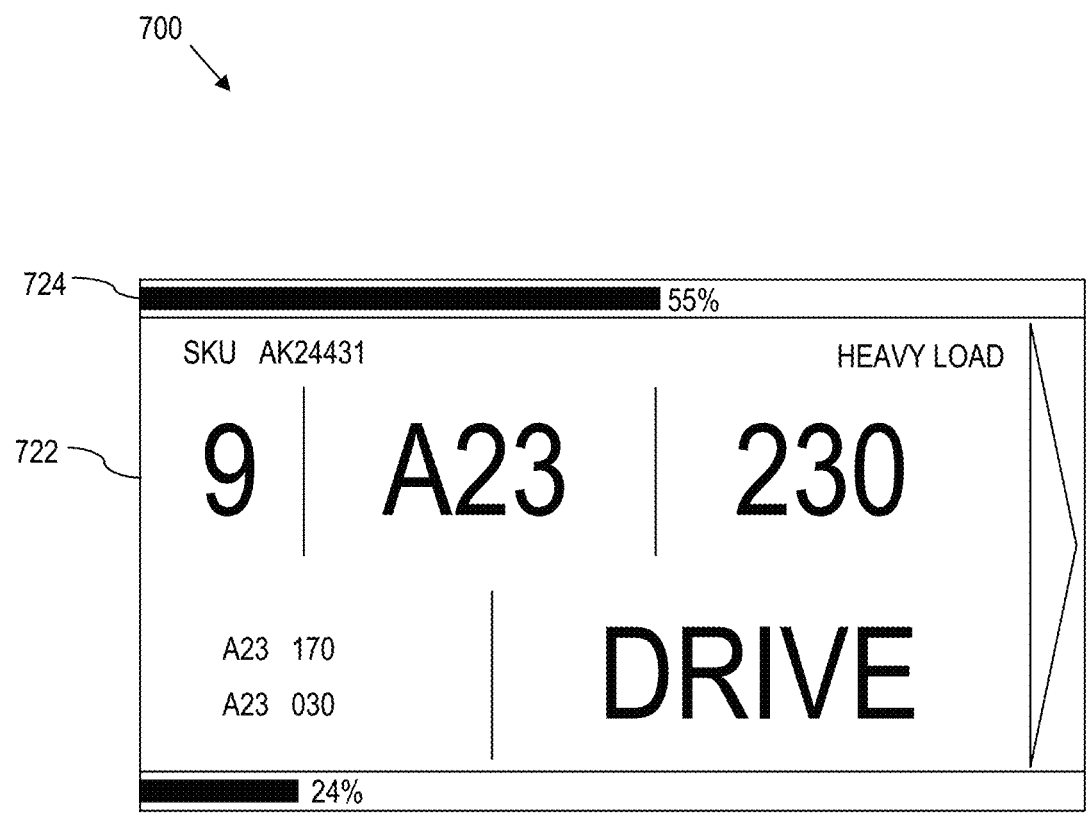
FIG. 14 is an exemplary operator view illustrating a drill down of the task list of FIG. 13, illustrating details about the current task, according to aspects of the present disclosure.

Referring to FIG. 14, an operator can drill down into the detail of the second view 712 to display a detailed pick information view 722. The detailed pick information view 722 provides information about the currently assigned task, including information on where the operator is to go within the facility, what SKU item to pick up and where to deliver the SKU.

With reference briefly back to FIG. 5, in addition to displaying the current state of the operator-specific performance profile instance as a progress meter (described with reference to FIG. 13), the method may further provide an interface view on the vehicle operator display that allows the operator to zoom into a specific task. In this regard, the interface view further displays a second progress meter that graphically represents the progress of the operator relative to the specific task selected by the operator.

For instance, referring back to FIG. 14, the top of the detailed pick information view 722 includes a running progress meter 724 illustrating to the operator, the overall progress of the tasks queued up to be completed, as described above. However, a second progress meter (seen at the bottom of the FIGURE) shows the local progress of the individual task that is being displayed.

The progress meters can be determined using industrial vehicle location tracking, e.g., as obtained by data sources such as those described with reference to FIG. 1, e.g., by the industrial vehicle information database 118, the tracking of product information in the WMS 120, knowledge of the layout and storage locations within a facility or combinations thereof.

Figure 15:
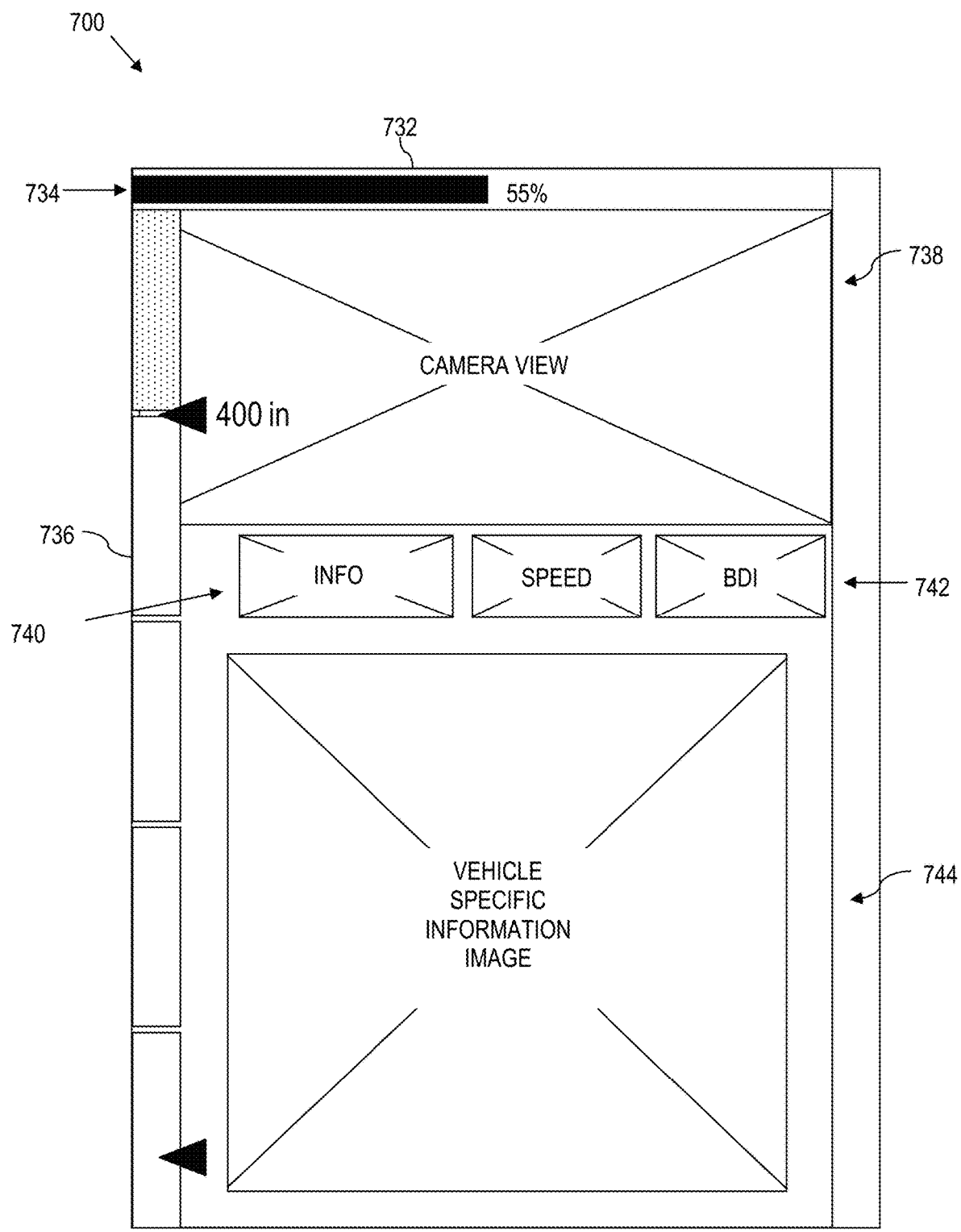
FIG. 15 is an exemplary operator view illustrating vehicle state information, which may be displayed on an industrial vehicle as illustrated in FIG. 1, according to aspects of the present disclosure.

Referring to FIG. 15, an output device can also display a vehicle view 732, which displays several consolidated vehicle measures in a single display.

With reference briefly back to FIG. 5, in addition to displaying the current state of the operator-specific performance profile instance as a progress meter (described with reference to FIG. 13), the method may further provide an interface view on the vehicle operator display that displays information in a first window that is generated by a component of the an industrial vehicle to which the vehicle operator display is mounted and displays information in a second window that is obtained from the second data source.

Referring back to FIG. 15, the top of the vehicle view 732 displays an overall progress meter 734 that tracks the operator throughout the operator shift. The progress meter 734 displays the operator's score in real-time as described more fully herein. The view also displays a graphical representation of the fork height along a vertical edge of the view. For instance, the exemplary vehicle view 732 includes a graphical representation of the fork height 736 (raised to 400 inches in the illustrated example). The representation of the fork height 736 is a real-time gauge that follows the actual height of the forks of the industrial vehicle controlled by the operator.

The vehicle view 732 also includes a camera display 738 that provides a camera view from the perspective of the forks. This allows an operator to view the forks as a pallet is retrieved or put away from a high storage location. The vehicle view 732 may further comprise abbreviated task information in a task view 740. Data displayed in the task view 740 may include data from the WMS system, such as instructions on a SKU and location of the SKU. The operator may be able to drill down into the details of FIG. 13 or FIG. 14 from the task view 740.

The vehicle view 732 also provides a widget area 742. The widget area 742 displays one or more gauges, such as a speed gauge, battery life gauge, etc. The vehicle view 732 still further provides a visual representation 744 of the industrial vehicle, tracking and displaying the actions of the forks, traction control and/or other vehicle parameters.

Figure 16:
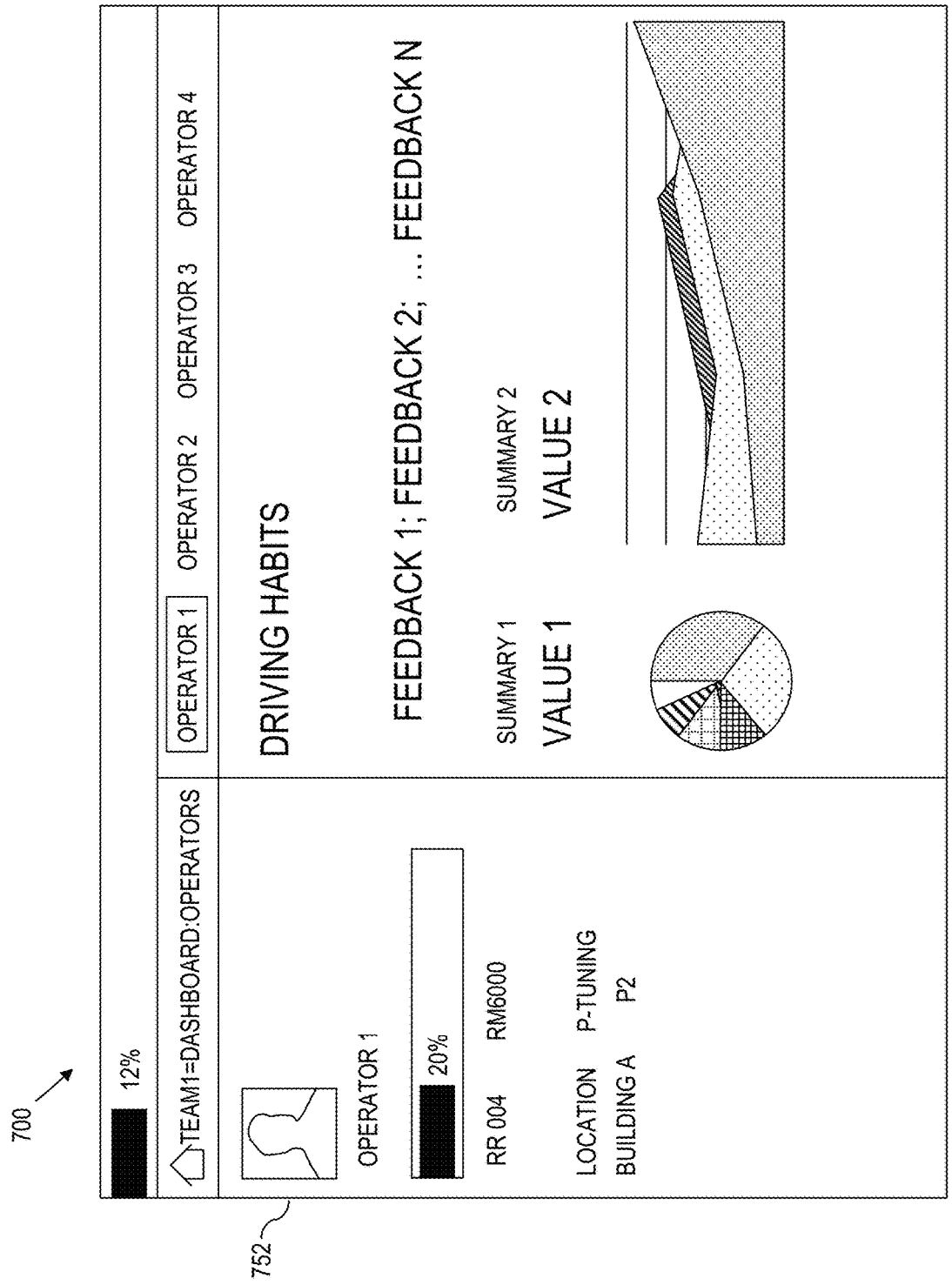
FIG. 16 is an exemplary operator view illustrating a summary of an operator's performance score, which can be displayed on one or more processing devices of FIG. 1, according to aspects of the present disclosure.
Figure 17:
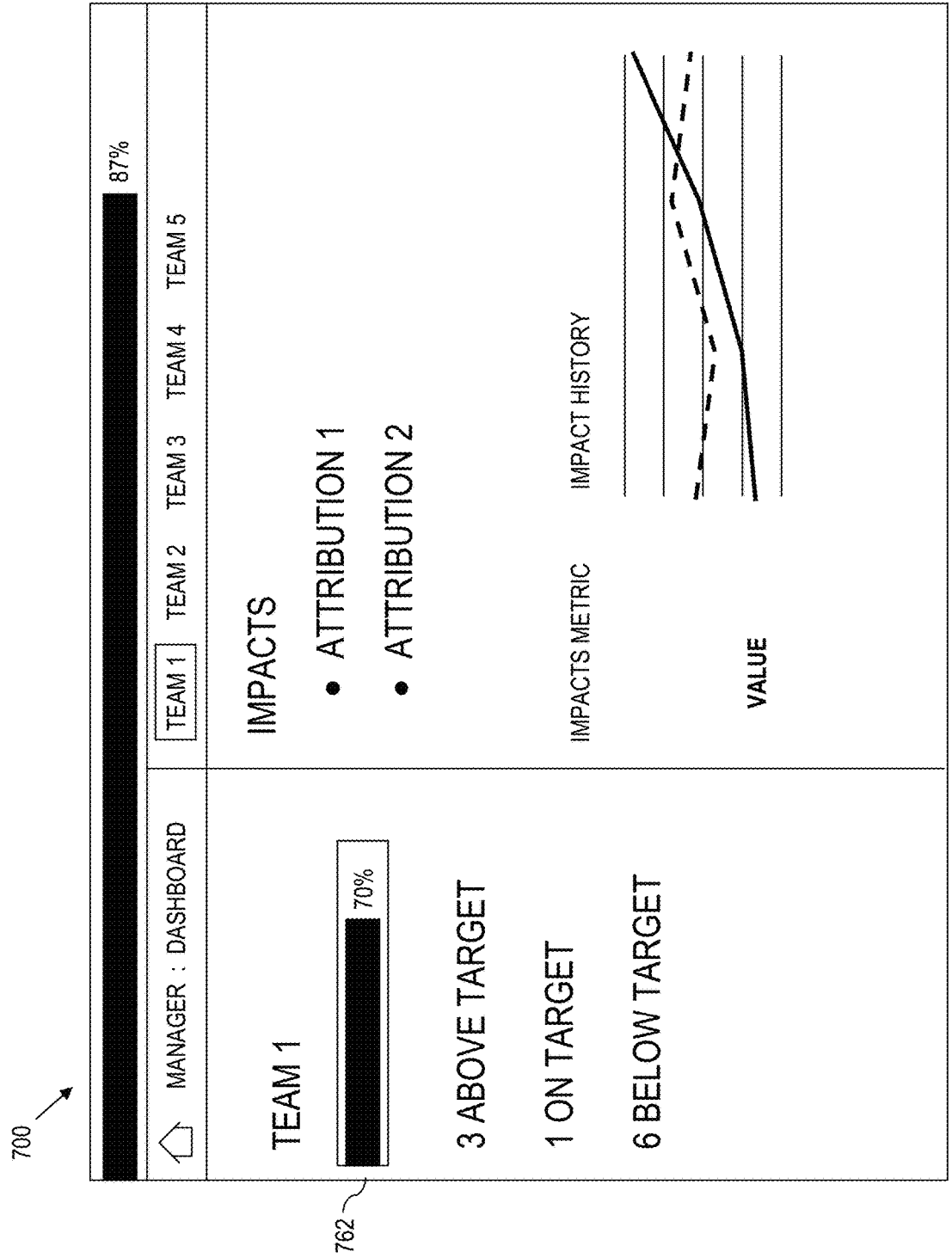
FIG. 17 is an exemplary operator view illustrating a summary of a team performance score, which can be displayed on one or more processing devices of FIG. 1, according to aspects of the present disclosure.

Regardless of whether a supervisor or manager provides feedback to the industrial vehicle operators, the display provided at the industrial vehicle 108 itself can be used to provide feedback to the operator not only as to the specific operator's performance, an example of which is illustrated in exemplary operator summary view 752 FIG. 16, but also the performance of the overall team, an example of which is illustrated in the exemplary team summary view 762 FIG. 17. In this regard, the views illustrated in FIGS. 16 and 17 are analogous to those set out in greater detail herein. For instance, FIG. 16 illustrates an operator view where the operator checks their personal score, e.g., as illustrated, a score of 20% (indicating that 20% of the operator's tasks are complete. The score is computed using the method set out in FIG. 5. Moreover, attributions are provided with visual representations as noted in greater detail herein. FIG. 17 illustrates an operator view where an operator checks the status of the operator's team. As illustrated, a team score is 70% (indicating that 70% of the team's tasks are complete. The score is computed using the method set out in FIG. 5. Moreover, attributions are provided with visual representations as noted in greater detail herein.

Moreover, because the underlying data is being measured based upon real-time data being provided directly by the industrial vehicles themselves (and by a WMS, ERP, HRMS, LMS, etc.) intelligent performance measures can be determined and dynamically updated, in real-time.

Exemplary Implementation:

The analysis engine 114 of FIG. 1, the structures of FIGS. 2-4, the method of FIG. 5 and the views of FIGS. 6-17 may all be implemented by computer executable code, such as a computer program product embodied on a non-transitory storage medium. For instance, the server 112 may comprise a processor coupled to memory. The memory includes computer instructions such that when the computer instructions are read out and processed by the processor, the computer performs the methods, implements the structures, and generates the views of FIGS. 6-17 herein.

As an example, a method of scoring industrial vehicle operators, comprises receiving data from an industrial vehicle 108, e.g., via an industrial vehicle linking device described herein, storing the data, e.g., in the industrial vehicle information database 118 and receiving log in information from a user logging into an industrial vehicle 108. The method also comprises determining a classification of the user based at least in part on the log in information (e.g., the user is in the role of industrial vehicle operator), selecting, with a processor, a display format based at least in part on the classification and displaying the data based at least in part on the display format, e.g., by providing a view (e.g., FIGS. 12-17). The system may further allow a supervisor, manager, etc., to divide up the fleet of industrial vehicles into teams of industrial vehicle operators and compute individual and team scores based upon associated performance profiles as described more fully herein. The results are displayed in a role appropriate dashboard view.

Miscellaneous:

Various aspects of the present disclosure herein provide a computational engine that produces data that is characterized in simple, plain-English, resulting in glanceable, actionable information. The information provides usable insight into an operation, such as the quality of labor data, accountability information, inspired operator confidence, continuous improvement, automated management, battery management, truck uptime/utilization, glanceable actionable information, etc.

For instance, given the hierarchical nature of the evaluation, an operator is associated with a single, overall score based upon a performance profile. However, that overall score is broken down into sub-scores based upon the evaluation of performance measures. A user can drill up or down in the level of detail for a given operator. Likewise, operators can be organized into teams. By aggregating the scores of the individual members of a team, an overall team score can be derived. This overall team score can be one aspect of a measure of a supervisor. Likewise, teams can be grouped into even further summarized divisions, e.g., shifts, location, etc. As the overall level of granularity changes, the metric, thresholds and text based actionable information is adjusted to be context appropriate.

Thus, an executive can look at data representing teams of managers. Each manager is represented by data computed from an aggregation of the supervisors under that manager. Each manager can look at data representing teams of supervisors under the manager. Each supervisor can be represented by an aggregation of the teams of operators assigned to that supervisor. Likewise, each team of operators can be represented by data computed from the individual team member (e.g., by comparing individual performance profile instances against thresholds, as described more fully herein). Thus, despite the different contexts and roles, the underlying data may be computed the same, with different aggregations and thresholds applied thereto.

In exemplary implementations, the analysis engine 114 observes industrial vehicle activity in real time, using available data, which may include location tracking information, industrial vehicle operator feedback, and industrial vehicle data to determine how the industrial vehicles are being used. The analysis engine 114 can also interact with other non-industrial vehicle specific databases, including warehouse management systems, labor management systems, etc., and uniquely associate information in these different domains with specific industrial vehicle operator metrics. The analysis engine 114 uses this data to provide actionable data on how to improve asset productivity.

In illustrative implementations, the analysis engine 114 answers questions surrounding an industrial vehicle's productivity. For instance, the analysis engine 114 can track a vehicle's performance settings and the industrial vehicle's actual responses in real time. Thus, with the industrial vehicle data provided by the system, users can see which industrial vehicles are performing as expected and which ones might need maintenance to improve overall productivity.

Moreover, the system can monitor industrial vehicle activity and measure it against preferred settings. The system can also measure the use cycles of the industrial vehicle 108 to determine aspects of vehicle use, such as whether the industrial vehicle 108 is in use regularly, whether the industrial vehicle 108 is performing as expected, whether the industrial vehicle 108 is consistently in use, etc. As such, operators have a direct view as to when an industrial vehicle is safe to operate and within compliance.

The analysis engine 114 can also enable users, such as supervisors and managers to see the real-time total cost of an industrial vehicle 108. For instance, the system can track the operating cost of an industrial vehicle 108 based on use cycles, battery health, age, maintenance costs, or combinations of the above. As such, the system can forecast the overall cost of an industrial vehicle 108 and relay that information to the user in real time.

The analysis engine 114 further allows users to track what tasks their industrial vehicles are doing and compare their performance. For instance, the system can track which tasks a vehicle performs, and can thus determine how an industrial vehicle is being used, if it's being used correctly to the vehicle potential, and if the operation is using the right kind of industrial vehicle for their tasks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure.

Having thus described the invention of the present application in detail and by reference to embodiments thereof, it will be apparent that modifications and variations are possible without departing from the scope of the invention defined in the appended claims.

What is claimed is:

1. A system for tracking performance of industrial vehicles, the system comprising:
   a first processing device in data communication with a remote server computer, the first processing device including a graphical user interface to:
   create, for each of a plurality of vehicle operators, a corresponding operator-specific performance profile instance, each operator-specific performance profile instance comprising an electronic record that stores in memory accessible by the remote server computer, a set of performance measures that characterize industrial usage by the associated vehicle operator;
   customize a threshold for an associated performance measure within the set of performance measures, the threshold storing in the memory, a baseline target achievement goal customized uniquely to the associated vehicle operator against the associated performance measure;
   customize an algorithm that is implemented by the remote server computer for at least one performance measure within the set of performance measures; and
   weight each performance measure in the set of performance measures so that performance measures in the set of performance measures contribute differently to an overall operator score;
   wherein each industrial vehicle in a fleet of industrial vehicles having a communication system comprising:
   a display; and
   an information linking device, the information linking device having a processor in data communication with the display, the processor further in data communication with a transceiver for communicating wirelessly across a network to the remote server computer, the processor programmed to:
   collect an operator login to identify the industrial vehicle operator, the industrial vehicle operator associated with a corresponding operator-specific performance profile instance;
   output to the display in a first view, an instruction to the operator to perform a task, where the instruction is wirelessly received from the remote server computer;
   collect automatically, industrial vehicle generated information as the industrial vehicle is operated over time to complete the task; and
   communicate automatically via the transceiver, the collected operator login and the collected industrial vehicle generated information to the remote server computer;

wherein the remote server computer further implements an analysis engine, the analysis engine programmed by code that causes the remote server computer to:
collect automatically, vehicle usage information from the received industrial vehicle generated information for electronic storage in an industrial vehicle data source;
update repeatedly, a current state of each operator-specific performance profile instance by implementing code to:
evaluate each performance measure in the set of performance measures based upon the customized algorithm;
generate a score for the current state of each operator-specific performance profile instance, where the generated score is based upon the weight assigned to each performance measure in the set of performance measures, the evaluated performance measure and the customized threshold;
wirelessly transmit first information to a select industrial vehicle in the fleet of industrial vehicles for processing thereby, where the transmitted first information is based upon the updated current state of the operator-specific performance profile instance of the associated vehicle operator, wherein the processor on the select industrial vehicle causes the display to output a second view that consolidates into a single screen:
a real-time status of a progress meter that identifies a current state of progress of the operator relative to the task based upon the first information; and
a current load height as a real-time gauge that follows the actual height of a load handling feature of the industrial vehicle that is carrying the load; and
transmit second information to a remote processing device, where the transmitted second information is based upon the updated current state of the operator-specific performance profile instance for each of the plurality of vehicle operators for output to the graphical user interface such that display of the transmitted second information on the graphical user interface comprises an attribution of performance metrics that are associated with the evaluated performance measure.

2. The system of claim 1, wherein:
each industrial vehicle in the fleet of industrial vehicles comprises an impact sensor;
a select one performance measure of each operator-specific performance profile instance comprises impacts that occur to a corresponding industrial vehicle;
the vehicle usage information collected automatically by the remote server computer includes impact data and position-related data indicating a location where the impact occurred; and
the analysis engine is further programmed to:
determine that collected impacts are occurring as a result of an environmental condition;
designate the location associated with the environmental condition as a quarantined location; and
weight impacts that occur in the quarantined location so that impacts in the quarantined location carry a lower weight than impacts not in the quarantined area.

3. The system of claim 1, wherein:
each industrial vehicle in the fleet of industrial vehicles comprises an impact sensor;
a select one performance measure of each operator-specific performance profile instance comprises impacts that occur to a corresponding industrial vehicle;
the vehicle usage information collected automatically by the remote server computer includes impact data; and
the graphical user interface of the first processing device is further configured to:
customize, for at least one operator-specific performance profile instance, a rule to define at least one of:
impacts as a count of impacts within a predetermined window; or
impacts as a count of impacts that occur while the industrial vehicle is moving.

4. The system of claim 1, wherein:
each industrial vehicle in the fleet of industrial vehicles comprises an impact sensor;
a select one performance measure of each operator-specific performance profile instance comprises impacts that occur to a corresponding industrial vehicle;
the vehicle usage information collected automatically by the remote server computer includes impact data; and
the graphical user interface of the first processing device is further configured to:
customize, for at least one operator-specific performance profile instance, a rule to define impacts as a count of impacts that occur after a pre-defined threshold number of impacts.

5. The system of claim 1 wherein:
the graphical user interface of the first processing device is further programmed to:
assign a group of operator-specific performance profile instances to a team; and
assign the team to a team-specific performance profile instance;
wherein the analysis engine of the remote server computer is further programmed to:
evaluate a current state of the team-specific performance profile instance based upon a current state of each operator-specific performance profile instance assigned to the team;
compute a team score based upon the current state of the team-specific performance profile instance; and
output a graphical representation of the team score to the graphical user interface.

6. The system of claim 5, wherein the analysis engine of the remote server computer is further programmed to:
customize a threshold target for at least one performance measure of each operator-specific performance profile instance of the team to normalize the team score;
compute a team score by aggregating results across each operator-specific performance profile instance associated with the team; and
output a representation of each team score in a manner that allows direct comparison of each computed team score to corresponding team scores of other teams.

7. The system of claim 1, wherein:
the collected industrial vehicle generated information comprises:
at least one of vehicle speed and direction of travel; and
at least one of load weight, and load height.

8. The system of claim 1, wherein the second view also consolidates into the single view:
a first widget that tracks and displays the actions of at least one of the load handling feature or a traction control of the industrial vehicle.

9. The system of claim 1, wherein:
the industrial vehicle generated information further comprises additional information, the additional information including at least one of temperature, battery state of charge, proprietary service code, and detected impacts; and
the processor controls the display to output in the second view, a graphical representation of the additional information.

10. The system of claim 1, wherein:
the industrial vehicle generated information is accessed by the information linking device from across a vehicle bus by reading at least one of event codes, states of switches, temperature readings, encoder data or controller data.

11. The system of claim 1, wherein:
the industrial vehicle generated information further comprises additional information, the additional information including information that identifies the operator as sitting down upon detecting that a seat switch is depressed.

12. The system of claim 1, wherein:
the industrial vehicle generated information further comprises additional information, the additional information including vehicle operator data comprising at least one of how and when traction controls are engaged, or how and when hydraulics are engaged; and
the processor controls the display to output in the second view, a graphical representation of the additional information.

13. The system of claim 1, wherein:
the information linking device on an associated industrial vehicle in the fleet of industrial vehicles automatically tracks when an operator is logged onto the industrial vehicle, when the operator is on or off the platform of the industrial vehicle, when the industrial vehicle is moving, and the industrial vehicle status while the vehicle is in motion.

14. The system of claim 1, wherein:
the processor of the information linking device on an associated industrial vehicle in the fleet of industrial vehicles is operatively programmed to track how many controlled motions an industrial vehicle operator performed to complete the task.

15. A system for tracking performance of a fleet of industrial vehicles, the system comprising:
a server computer comprising an analysis engine that is configured to compute and update at least one performance metric of an operator of an industrial vehicle that is selected from the fleet of industrial vehicles, the computer server being in data communication with a graphical user interface display;
a display on the industrial vehicle; and
an information linking device having a processor in data communication with the display, the processor further communicates wirelessly across a network to the server computer, the processor programmed to:
collect an operator login to identify the industrial vehicle operator;
output to the display in a first view, a task to be performed by the industrial vehicle, where the task is wirelessly received from the server computer;
collect automatically, industrial vehicle generated information as the industrial vehicle is operated over time to complete the task, the industrial vehicle generated information including vehicle speed, direction of travel, load weight, and load height;
communicate automatically, the collected operator login and the collected industrial vehicle generated information to the server computer; and
output to the display, a second view that consolidates into a single screen a real-time status of a progress meter that identifies a current state of progress of the industrial vehicle relative to the task, wherein the second view outputs:
a current load height as a real-time gauge that follows the actual height of a load handling feature of the industrial vehicle that is carrying the load along; and
a first widget that displays the current speed of the industrial vehicle along with a vehicle view that provides a visual representation that tracks and displays the actions of at least one of the load handling feature or the a traction control of the industrial vehicle; and
output an attribution of the at least one performance metric that has been generated by the analysis engine to the graphical user interface display.

16. An industrial vehicle information system, the system comprising:
a graphical user interface display;
a display on an industrial vehicle;
a camera on the industrial vehicle;
an information linking device having a processor in data communication with the display and the graphical user interface display, the processor further communicates wirelessly across a network to a remote server computer, the processor also in data communication with the camera, the processor programmed to:
collect an operator login to identify the industrial vehicle operator;
output to the display in a first view, an instruction to the operator to perform a task, where the instruction is wirelessly received from the remote server computer;
collect automatically, industrial vehicle generated information as the industrial vehicle is operated over time to complete the task, the industrial vehicle generated information including vehicle speed, direction of travel, load weight, and load height;
communicate automatically, the collected operator login and the collected industrial vehicle generated information to the remote server computer;
output to the display, a second view that consolidates into a single screen a real-time status of:
a progress meter that identifies a current state of progress of the operator relative to the task;
a current load height as a real-time gauge that follows the actual height of a load handling feature of the industrial vehicle that is carrying the load along with a camera view from the camera, that displays images from the perspective of the load handling feature, so as to allow the operator to view the load handling feature as the load is retrieved or put away from a high storage location; and
a first widget that displays the current speed of the industrial vehicle along with a vehicle view that provides a visual representation that tracks and displays the actions of at least one of the load handling feature or the traction control; and output to the graphical user interface display an attribution of at least one performance metric of the operator relative to the task.

17. A system for tracking performance of industrial vehicles, the system comprising:
   a first processing device in data communication with a remote server computer, the first processing device including a graphical user interface to:
      create, for each of a plurality of vehicle operators, a corresponding operator-specific performance profile instance, each operator-specific performance profile instance comprising an electronic record that stores in memory accessible by the remote server computer, a set of performance measures that characterize industrial usage by the associated vehicle operator;
      customize a threshold for an associated performance measure within the set of performance measures, the threshold storing in the memory, a baseline target achievement goal customized uniquely to the associated vehicle operator against the associated performance measure;
      customize an algorithm that is implemented by the remote server computer for at least one performance measure within the set of performance measures; and
      weight each performance measure in the set of performance measures so that performance measures in the set of performance measures contribute differently to an overall operator score;
   wherein each industrial vehicle in a fleet of industrial vehicles having a communication system comprising:
      a display;
      an information linking device, the information linking device having a processor in data communication with the display, the processor further in data communication with a transceiver for communicating wirelessly across a network to the remote server computer;
      a camera in data communication with the processor of the information linking device;
      wherein the processor is programmed to:
         collect an operator login to identify the industrial vehicle operator;
         output to the display in a first view, an instruction to the operator to perform a task, where the instruction is wirelessly received from the remote server computer;
         collect automatically, industrial vehicle generated information as the industrial vehicle is operated over time to complete the task; and
         communicate automatically via the transceiver, the collected operator login and the collected industrial vehicle generated information to the remote server computer;
   wherein the remote server computer further implements an analysis engine, the analysis engine programmed by code that causes the remote server computer to:
      collect automatically, vehicle usage information from the received industrial vehicle generated information for electronic storage in an industrial vehicle data source;
      update repeatedly, a current state of each operator-specific performance profile instance by implementing code to:
         evaluate each performance measure in the set of performance measures based upon the customized algorithm;
         generate a score for the current state of each operator-specific performance profile instance, where the generated score is based upon the weight assigned to each performance measure in the set of performance measures, the evaluated performance measure and the customized threshold;
      wirelessly transmit first information to a select industrial vehicle in the fleet of industrial vehicles for processing thereby, where the transmitted first information is based upon the updated current state of the operator-specific performance profile instance of the associated vehicle operator, wherein the processor on the select industrial vehicle outputs to the display on the select industrial vehicle, a second view that consolidates into a single screen a real-time status of a progress meter that identifies a current state of progress of the operator relative to the task, and a camera view from the camera that displays images from the perspective of a load handling feature of the associated industrial vehicle, so as to allow the operator to view the load handling feature as the load is retrieved or put away from a storage location; and
      transmit second information to a remote processing device, where the transmitted second information is based upon the updated current state of the operator-specific performance profile instance for each of the plurality of vehicle operators for output to the graphical user interface such that display of the transmitted second information on the graphical user interface comprises an attribution of performance metrics that are associated with the evaluated performance measure.

* * * * *

UNITED STATES PATENT AND TRADEMARK OFFICE
CERTIFICATE OF CORRECTION

PATENT NO. : 11,521,151 B2
APPLICATION NO. : 17/002437
DATED : December 6, 2022
INVENTOR(S) : Sergio Schulte de Oliveira et al.

Page 1 of 1

It is certified that error appears in the above-identified patent and that said Letters Patent is hereby corrected as shown below:

In the Specification

Column 6, Line 22, "perform computations" should read --perform computations,--.
Column 8, Line 22, "such poor" should read --such as poor--.
Column 18, Line 6, "lowest ranged location" should read --lowest ranked location--.
Column 23, Line 28, "of the an industrial" should read --of the industrial--.

In the Claims

Column 30, Line 21, Claim 15, "or the a traction control" should read --or a traction control--.

Signed and Sealed this
Twelfth Day of December, 2023

Katherine Kelly Vidal
*Director of the United States Patent and Trademark Office*